(12) United States Patent
Virtanen et al.

(10) Patent No.: US 9,243,146 B2
(45) Date of Patent: Jan. 26, 2016

(54) HYBRID MATERIALS AND RELATED METHODS AND DEVICES

(75) Inventors: Jorma Virtanen, Jyväskylä (FI); Mikko Tilli, Jyväskylä (FI); Pasi Keinänen, Jyväskylä (FI)

(73) Assignee: Amroy Europe Oy, Lahti (FI)

( * ) Notice: Subject to any disclaimer, the term of this patent is extended or adjusted under 35 U.S.C. 154(b) by 1696 days.

(21) Appl. No.: 11/665,089

(22) PCT Filed: Oct. 11, 2005

(86) PCT No.: PCT/FI2005/000437
§ 371 (c)(1),
(2), (4) Date: Feb. 9, 2009

(87) PCT Pub. No.: WO2006/040398
PCT Pub. Date: Apr. 20, 2006

(65) Prior Publication Data
US 2009/0171106 A1 Jul. 2, 2009

(30) Foreign Application Priority Data

| Oct. 12, 2004 | (FI) | 20041318 |
| Oct. 12, 2004 | (FI) | 20041322 |
| Nov. 9, 2004 | (FI) | 20041436 |
| Dec. 23, 2004 | (FI) | 20041658 |
| Jan. 31, 2005 | (FI) | 20050102 |
| Apr. 21, 2005 | (FI) | 20050407 |
| Apr. 26, 2005 | (FI) | 20050431 |

(51) Int. Cl.
*C01B 31/00* (2006.01)
*C09C 1/56* (2006.01)
(Continued)

(52) U.S. Cl.
CPC .............. *C09C 1/565* (2013.01); *B82Y 30/00* (2013.01); *B82Y 40/00* (2013.01); *C01B 31/0273* (2013.01);
(Continued)

(58) Field of Classification Search
CPC ............................ B82Y 30/00; C01B 31/00
USPC ........................... 549/512; 204/157.47
See application file for complete search history.

(56) References Cited

U.S. PATENT DOCUMENTS 7,601,421 B2 * 10/2009 Khabashesku et al. .... 428/297.4
2002/0004028 A1 * 1/2002 Margrave et al. .......... 423/447.3
(Continued)

FOREIGN PATENT DOCUMENTS

| EP | 1428793 A1 * 6/2004 ............. C01B 31/02 |
| WO | 03/086961 10/2003 |

OTHER PUBLICATIONS

Hilding et al., Dispersion of Carbon Nanotubes in Liquids; Journal of Dispersion Science and Technology; vol. 24, No. 1. pp. 1-41; 2003.
(Continued)

*Primary Examiner* — Megan McCulley
(74) *Attorney, Agent, or Firm* — Fildes & Outland, P.C.

(57) ABSTRACT

The invention provides devices and methods for end and side derivatization of carbon nanotubes. Also facile methods to attach moieties and nanoparticles on the side walls and both ends are described. The invention provides hybide materials for analytical, and optoelectronic purposes as well as materials applications. Materials have improved properties in the areas of tensile, electrical and thermal conductivity.

17 Claims, 26 Drawing Sheets

Figure 1:
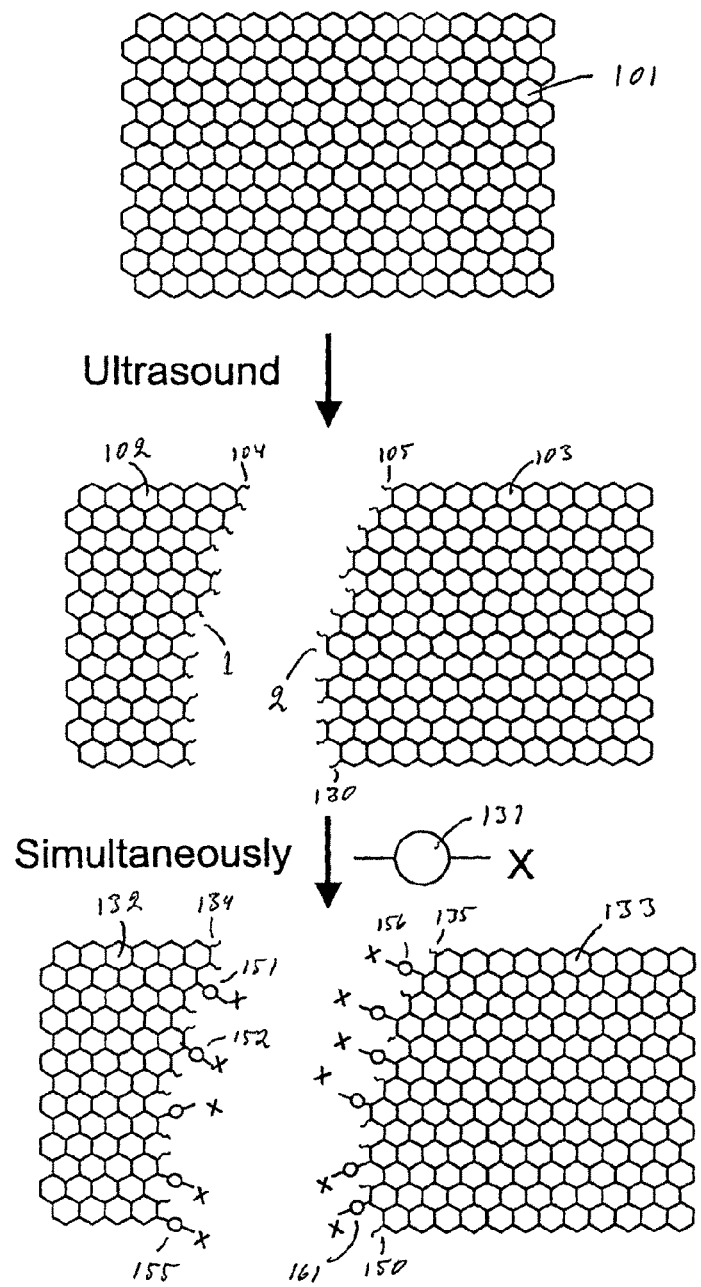

(51) Int. Cl.
  *B82Y 40/00* (2011.01)
  *C01B 31/02* (2006.01)
  *C01B 31/04* (2006.01)
  *B82Y 30/00* (2011.01)
  *C09C 1/48* (2006.01)

(52) U.S. Cl.
  CPC . *C01B 31/04* (2013.01); *C09C 1/48* (2013.01); *C01B 2202/28* (2013.01); *C01P 2002/82* (2013.01); *C01P 2004/03* (2013.01); *C01P 2004/13* (2013.01)

(56) References Cited

U.S. PATENT DOCUMENTS

| | | | |
|---|---|---|---|
| 2002/0159943 A1* | 10/2002 | Smalley et al. | 423/447.1 |
| 2002/0197474 A1* | 12/2002 | Reynolds | 428/398 |
| 2004/0071624 A1* | 4/2004 | Tour et al. | 423/447.1 |
| 2004/0217520 A1* | 11/2004 | Hong et al. | 264/442 |
| 2004/0222080 A1* | 11/2004 | Tour et al. | 204/157.15 |
| 2005/0074613 A1* | 4/2005 | Tour et al. | 428/408 |
| 2006/0166003 A1* | 7/2006 | Khabashesku et al. | 428/413 |
| 2006/0246438 A1* | 11/2006 | McCall et al. | 435/6 |
| 2009/0301896 A1* | 12/2009 | Tour et al. | 205/432 |
| 2010/0143701 A1* | 6/2010 | Zhu et al. | 428/323 |
| 2010/0159219 A1* | 6/2010 | Park et al. | 428/206 |
| 2010/0166637 A1* | 7/2010 | Ziegler | 423/447.1 |
| 2010/0317820 A1* | 12/2010 | Khabashesku et al. | 528/60 |
| 2011/0057153 A1* | 3/2011 | Cha et al. | 252/514 |
| 2011/0086987 A1* | 4/2011 | Sample et al. | 525/420 |

OTHER PUBLICATIONS

Khabashesku et al.; Fluorination of Single-Wall Carbon Nanotubes and Subsequent Derivatization Reactions; Accounts of Chemical Research; vol. 35, pp. 1087-1095; 2002.

Lin et al.; Polymeric Carbon Nanocomposites from Carbon Nanotubes Functionalized with Matrix Polymer; Macromolecules, American Chemical Society; vol. 36, pp. 7199-7204; 2003.

Thien-Nga et al.; Mechanical Purification of Single-Walled Carbon Nanotube Bundles from Catalytic Parti-cles; Nano Letters; American Chemical Society; vol. 2, No. 12, pp. 1349-1352; 2002.

Xia et al.; Polymer-Encapsulated Carbon Nanotubes Prepared through Ultrasonically Initiated in Situ Emul-sion Polymerization; Chemistry of Materials, American Chemical Society; vol. 15, pp. 3879-3886; 2003.

Yudasaka et al; Effect of an organic polymer in purification and cutting of single-wall carbon nanotubes; Applied Physics A; vol. 71, pp. 449-451; 2000.

European Action dated Apr. 19, 2013.

* cited by examiner

A.

B.

AM = affinity mol

A.

B.

HYBRID MATERIALS AND RELATED METHODS AND DEVICES

CROSS REFERENCE TO RELATED APPLICATIONS

This application claims priority from Finnish Application Serial No. 20041322, filed Oct. 12, 2004, and Finnish Application Serial No. 20041318, filed Oct. 12, 2004, and Finnish Application Serial No. 20041436, filed Nov. 9, 2004, and Finnish Application Serial No. 20041658, filed Dec. 23, 2004, and Finnish Application Serial No. 20050102, filed Jan. 31, 2005, and Finnish Application Serial No. 20050407, filed Apr. 21, 2005, and Finnish Application Serial No. 20050431, filed Apr. 26, 2005.

BACKGROUND

1. Field of the Invention

The invention provides devices and methods for end and side derivatization carbon containing materials, such as graphite, carbon nanotubes and analogous structures. Also facile methods to attach moieties and nanoparticles on the side walls and both ends of the carbon nanotubes are described. The invention provides hybide materials for materials applications. Materials have improved properties in the areas of tensile strength, Young's modulus, glass transition temperature, chemical resistance, and electrical or thermal conductivity.

2. Prior Art and Overall Description

There is a continuous need for stronger and lighter materials. Also the supply of the materials should be stable for any foreseeable future. Carbon based new materials, such as graphite fiber and carbon nanotubes, offer great promises to fulfill all these goals. Especially carbon nanotubes (CNTs) have highest tensile strength than any other material. Moreover, they are best electrical conductors at ambient temperature. Despite of great promises there are many problems for the utilizations of the CNTs.

Graphite and CNTs have been used as additives in plastics and composites (Chasiotis I, et al., Multiscale Experiments on Graphite Nanoplatelet/Epoxy Composites, SEM X International Congress and Exposition on Experimental and Applied Mechanics, Costa Mesa, Calif. 2004, Odegard G. M., et al., AIAA Journal 43 (2005) 1828). Often improvement in some properties, such as modulus or break stress, is observed (Qian D, et al., Appl. Phys. Lett. 76 (2000) 2868). When the CNTs are chemically coupled with a polymer the improvements can be significant (Blake R, et al., A generic organometallic approach toward ultra-strong carbon nanotube-polymer composites, J. Am. Chem. Soc. 126 (2004) 10226), although modified CNTs were used as an additive (less than 1%) and were not strongly bonded with the bulk. Polymer side chains have been polymerized from carbon nanotube attached catalysts (Dubois P., et al., WO2005012170, Polymer-Based Composites Comprising Carbon Nanotubes as a Filler, Method for Producing Said Composites, and Associated Uses, 10.2.2005)

Graphite is a hexagonal network of carbon atoms, which are covalently bonded. Covalent bonding is a strongest chemical bond, and carbon-carbon bond is very strong, and in addition that bond has double bond character in the graphite. Carbon nanotubes can be imagined to be formed from a long and narrow graphite sheet by rolling that sheet into a tubular form. Thus, the local structure of graphite and carbon nanotubes is very similar, i.e., it consists of hexagonally bonded carbon atoms. Several graphite-like tubes can be concentric forming multi-walled CNTs. The curvature in the CNTs makes them more reactive than the graphite, although the difference is small between very large multi-walled CNTs and graphite. However, many modification methods of this invention are also applicable to graphite. This invention covers all graphite-like or graphite derived materials, although currently CNTs are most preferred starting materials for hybride materials of this invention.

Composites are traditional way to improve properties of an existing material. Composites have relative coarse structure. Also the various components are not generally chemically strongly bonded. When the structural features are in nanoscale, the borderline between a homogeneous material and composite starts to disappear. This is the case especially, if the components are chemically bonded. With nanostructured materials the term "hybrid materials" is preferred. In hybrid materials various types of chemical moieties or particles can be combined. Components include organic, inorganic, polymeric, and biological molecules and particles. Carbon nanotubes or some other graphite like material is one of these components in this invention, while other components are freely chosen from any of the mentioned classes. In the present invention some or all components are covalently attached with the graphitic materials. In that sense the graphitic materials can be considered as a starting material for the hybride materials of this invention (Hybtonites). The end product contains other elements than carbon, and also other structures than tubes. When the CNTs are starting materials, the end products can not be considered to be CNTs any more, but rather hybride tubes, hybride trees, hybride nets, hybride dendrimers, hybride clusters, hybride monolayers, etc. These can be further organized into higher order hierarchial materials, such as fibers, films, and bulk material, collectively Hybtonites. The situation is completely analogous with all chemical processes, in which the starting material and end product are clearly distinct entities. In this regard, the term hybride nanotube will be used to cover all possible hybride materials, in which CNTs have been one starting material. Corresponding acronym is HNT. The name hydride nanotube emphasizes the fact that these materials have significant amounts of other elements than carbon, and their chemical and physical properties have some unique characteristics. More generally hybride nanostructures derived from graphite or other graphite like materials are denoted by an acronym HNG.

In order the CNTs to be made totally only of carbon they should have at both ends half-fullerene caps. In reality the ends are often open either because they were never capped or the CNTs were cut during purification process. When a CNT is cut by sonification or some other method, the carbon atoms at the ends will have dangling bonds, which are extremely reactive. Cutting is typically done in air or water. Accordingly, a lot of oxygen containing small molecules is nearby. Carbon atoms tend to bind to oxygen forming fenolic and carboxylic functional groups. The present invention allows the suppression of oxidation, and performing a myriad of other reactions during cutting of graphitic materials. The formation of oxygen containing functionalities can be virtually prevented at the expense of deliberately chosen reaction. Alternatively, the formation of certain oxygen containing species can be purposefully enhanced by the methods of this invention.

Ultrasonic vibration is commonly used method to accelerate chemical reactions, and especially heterogeneous reactions. An example is the synthesis of oligonucleotides on the surface of micro- and nanosized silica particles so that the diffusion of the reagents is enhanced by ultrasonic vibration.

Cutting cellulose under oxidative conditions has been described (Siegel N., et al., U.S. Pat. No. 5,073,216, Method of ultrasonically cutting fibrous materials and devices therefrom, Dec. 17, 1991). Also reactions between functionalized CNTs and appropriate reagents benefit from the ultrasonic vibration. One example is the reaction between epoxy resist SU-8 oxidized CNTs that contains hydroxyl and carboxyl groups (N. Zhang et al., Smart Mater. Struct. 12 (2003) 280). However, the reactions that have been performed in the art have been such that they would happen without ultrasonic vibration. This is a sharp contrast to the present invention, in which the ultrasound actually enables the reaction by activation the graphitic material itself. This is not a minor difference, because thus typically one or more chemical steps will be avoided in the present invention, what is especially important in industrial production.

Ultrasound creates locally very high pressure and temperature points into the reaction mixture. The temperature can be thousand degrees or more in nano- or microscopic volumes. These high temperatures are randomly located in migrating interference points. Ultrasound induced physical modification of the CNTs have been observed (Iijima S., et al., WO03057622, Porous carbon nanostructure and method for preparation thereof, Jun. 17, 2003)

CNTs have highest tensile strength of any material. This statement is true for one CNT. However, there are still problems in producing macroscopic pieces of CNT based materials. CNTs can be used to reinforce existing materials. However, their straight structure and slippery graphite-like surface is not favorable for this purpose, because the material around them can easily slip. The slippage will eliminate most of the reinforcing effect that the CNTs might have. Chemical cross-linking might damage the CNTs, if it is extensive. The present invention provides methods to avoid the slippage without damaging the CNTs significantly.

SUMMARY OF THE PRESENT INVENTION

The present invention provides methods to fabricate CNT and graphite-like materials based hybride materials via derivatization of the ends of the CNTs and/or either covalent or noncovalent derivatization of the sidewalls or edges or vertices of graphitic materials so that attachment of inorganic, organic, polymeric, and biological molecules and particles is enabled. These hybride materials, HNTs and HNGs, collectively Hybtonites, are stronger, lighter, and/or more corrosion resistant than current materials. In addition these materials can be "smart" materials so that they have sensor properties and can adapt into changing conditions.

One embodiment of this invention provides devices for the laboratory and industrial scale production methods and devices of the modified HNTs. Currently preferred cutting and modification method is sonification that is performed in an environmentally protected chamber, and gaseous, liquid or solid reagents or particles can be added either before, or during sonification into the chamber while oxygen and/or water are excluded. The progress of the reaction may be monitored by optical or electrical means. The device may also contain magnetic, and hydrophobic separation means for the removal of magnetic particles, and amorphous carbon.

In another embodiment of this invention the cutting and modification method is a strong alternating electromagnetic field that in an environmentally protected chamber in a presence of gaseous reactants, such as ammonia, or oxygen.

It is a further object of the present invention to provide asymmetrically end substituted HNTs by repeating the derivatization process in the presence of different chemicals and particles. Similarly, multiply substituted HNGs can be produced by sequential treatments.

It is an additional object of the present invention to provide continuous industrial scale reaction, and purification devices and methods. These embodiments include flow cell for the reaction, and magnetic and hydrophobic rollers for the purification, or alternatively magnetic flow network. Ultrasonic vibration is the currently preferred cutting method in a flow cell. The ultrasonic rod may have surface structure that creates traveling interference points. Alternatively, two or more rods may be in the same space, and variation of their relative intensity creates controlled interference patterns.

It is one purpose of the present invention to provide asymmetrically substituted HNTs, which can be farther reacted with molecules or nanoparticles so that two different molecules or nanoparticles are at each end. These products can be further used to create nanoelectronic circuitry, and also have applications in sensors.

In one embodiment of the current invention the HNTs and HNGs are cross-linked by a reactant so that covalently bonded networks will be formed. These networks can have dendritic structures, which have utility in nanoelectronics, sensors, and new materials.

One purpose of the present invention is to provide stronger materials that are applicable in aerospace, automobile, and machine industry. These materials have high tensile strength and/or good electrical and/or thermal conductivity. Aerospace, automobile, and machine applications include body, frame, rollers, and various panels.

Another embodiment of the present invention allows the fabrication of lighter and/or more durable sports equipments. Sports equipments include but are not limited to rackets, racquets, base ball bats, golf clubs, ice hockey sticks, cross-country and down-hill skis, bikes, fishing rods.

Another purpose is to provide material for construction industry for bridges, buildings, pipes, and containers. Materials may be used in support structures, or as coating materials.

The present invention provides further nanostructured materials that can be injection molded like plastics and still are comparable to composites in the strength. Nanosized components of the mixture are analogous to monomers in the traditional polymer fabrication. They will be chemically connected inside the mold to form a desired shape.

The present invention also provides methods to join together two pieces by heating with electromagnetic radiation a material that is placed between the surfaces of these two pieces. Pieces can be any material that will soften enough during the radiation. Plastics and composite materials are especially well suited. Currently microwave radiation is preferred, in which case the method is microwave welding.

It is a further object of the present invention to provide materials that absorb the electromagnetic radiation so that the surfaces will also be heated. These materials are called linkers. Currently preferred linkers are HNTs that may be coupled with metal or metal containing nano and micro particles. Heating may also induce chemical reactions so that the linkers are also chemically bound at least with one surface.

One embodiment of this invention provides microwave source and waveguide so that the radiation can be targeted close to the surfaces that are being welded, or alternatively serve as molds.

Still another embodiment of the present invention provides materials for electromagnetic shields, such as EMP protection. These materials have applications in electromagnetic signal transmission, including cell phone, TV, and radio relay stations, military, and space applications.

FIGURE CAPTIONS

FIG. 1 Schematic depiction of a graphite-like material 101 with a reagent 131, when the graphitic structure is cleaved, and nascent edges 1 and 2 with dangling bonds 104, 105, . . . , 130 are formed.

Figure 2:
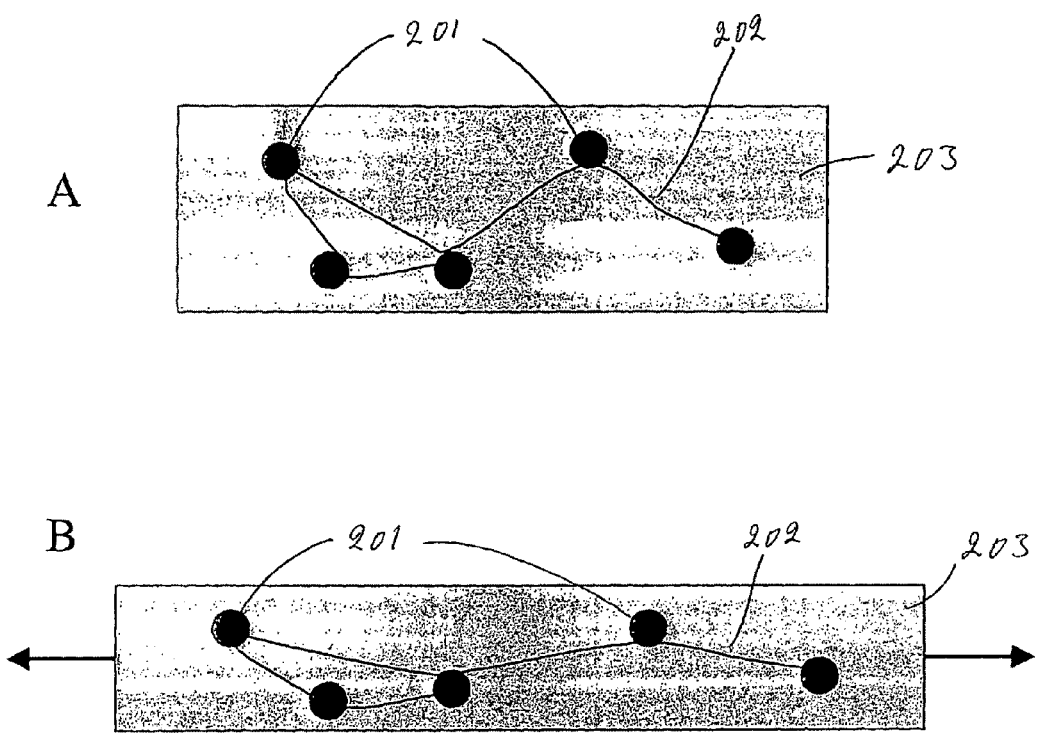

FIG. 2 Schematic depiction of one hybrid material 203 of this invention, in which particles 201 are connected with a HNT network 202. A. Relaxed state. B. Stretched material.

Figure 3:
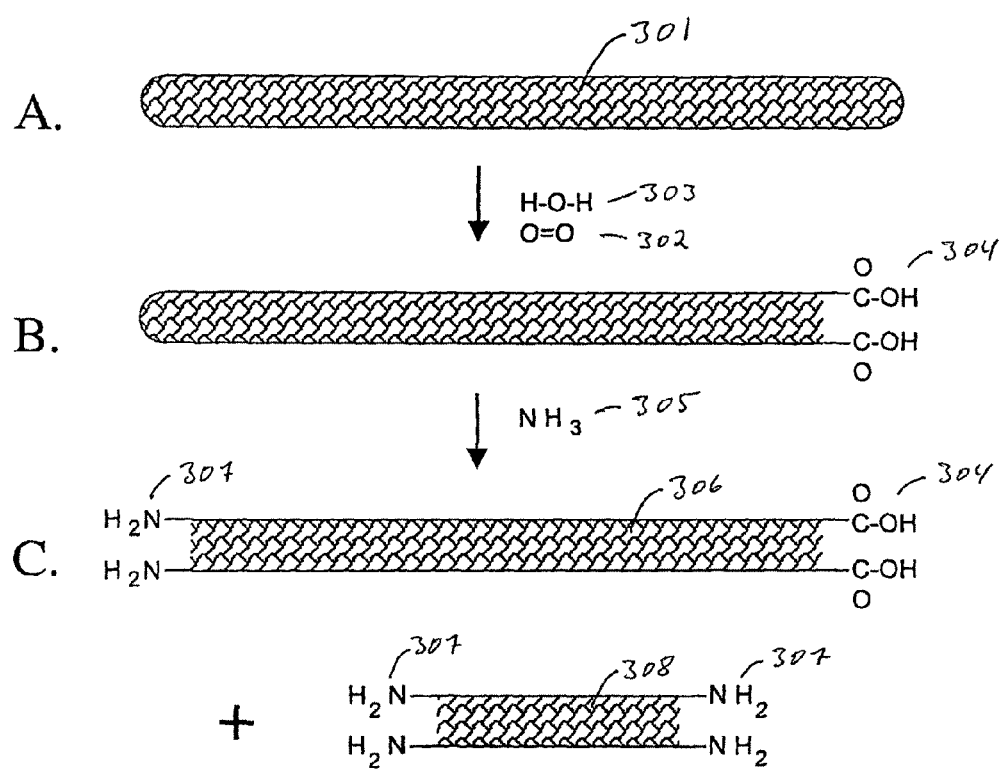

FIG. 3 A-B. Schematics of the formation of carboxyl terminated 304 CNTs. C. Schematic depiction of the cutting and further derivatization of the second end by amino groups 307. Symmetric amino terminated HNTs 308 are a byproduct.

Figure 4:
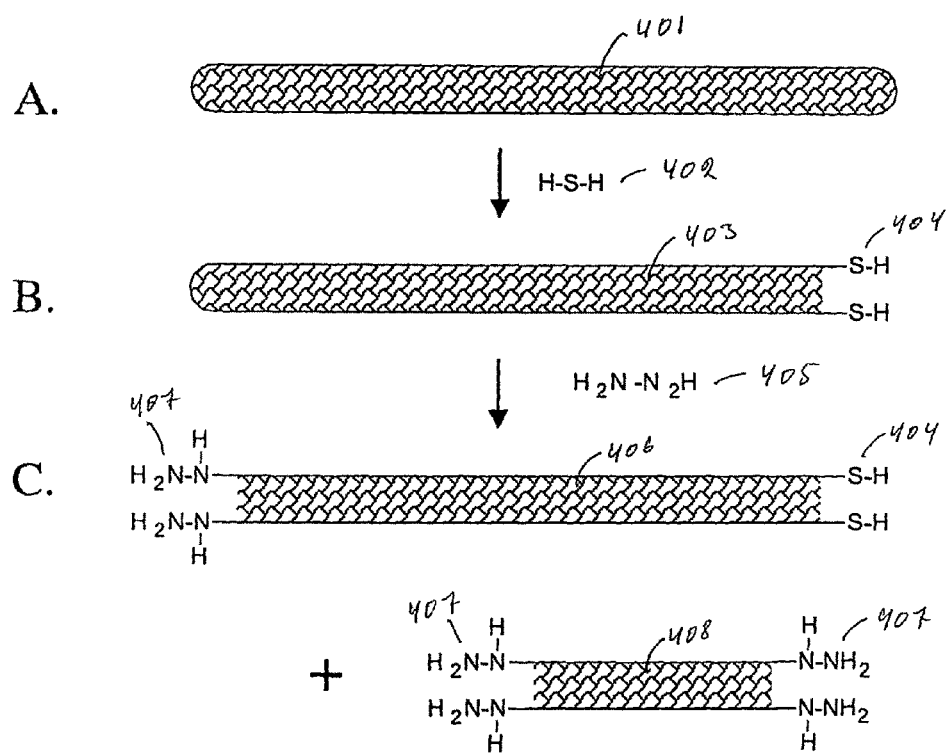

FIG. 4 A-B. Schematics of the formation of thiol terminated 404 HNTs 403. C. Schematic depiction of the cutting and further derivatization of the second end by hydrazino groups 407. Symmetric hydrazino terminated HNTs 408 are a byproduct.

Figure 5:
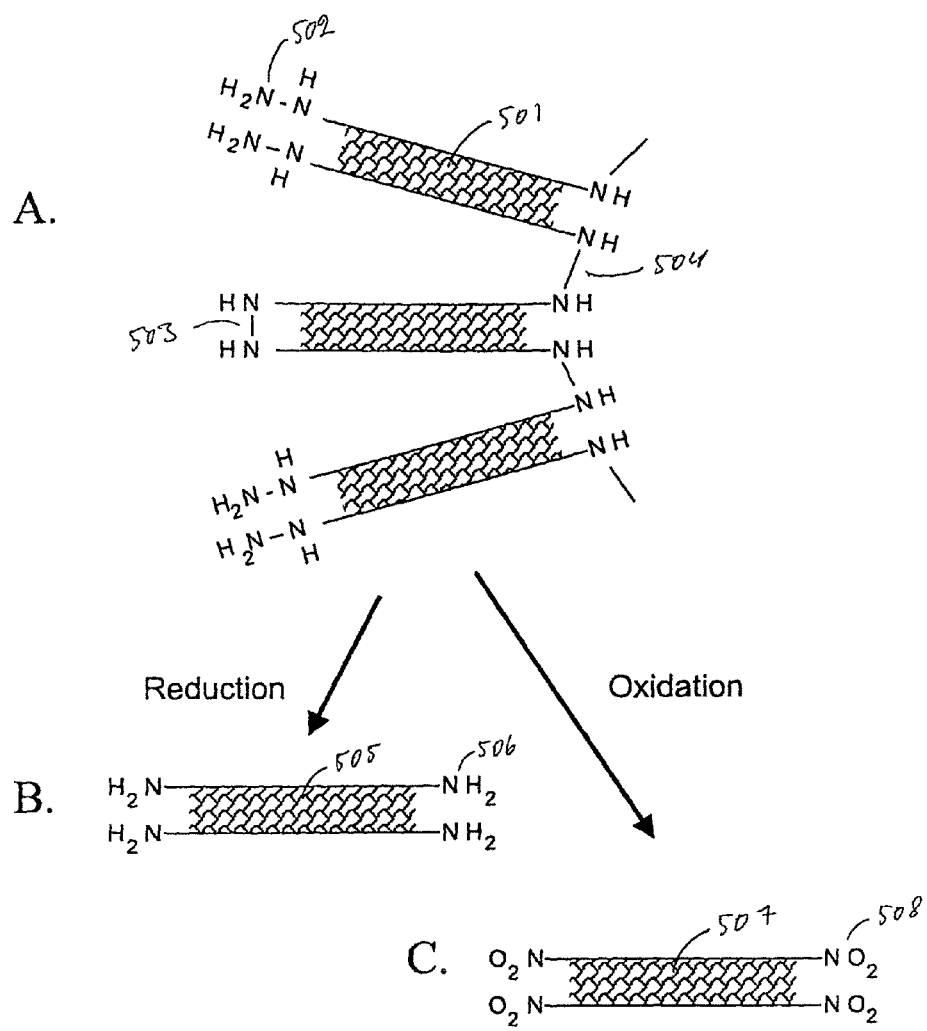

FIG. 5 A. Schematic depiction of the hydrazine end-linked HNTs 501, and B. Reduction into separated aminoterminated HNTs 505. C. Oxidation into separated nitro terminated HNTs 507.

Figure 6:
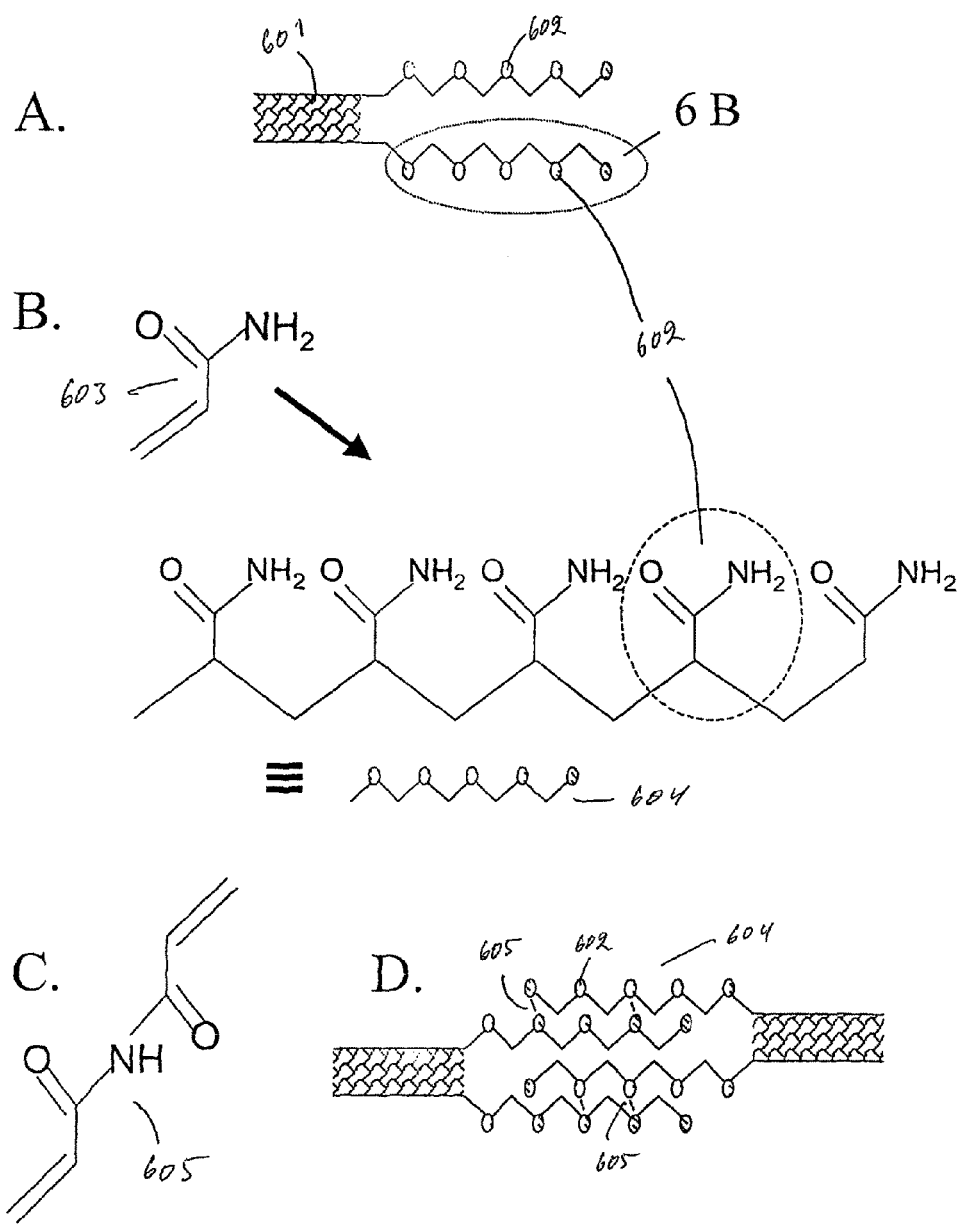

FIG. 6 A-B. Schematic representation of the end polymerization of the HNTs. In this embodiment the monomer is acrylamide 603. C. Bisacrylamide cross-linker 605. D. Cross-linked 605 end polymers 604 that have covalently connected two HNTs.

Figure 7:
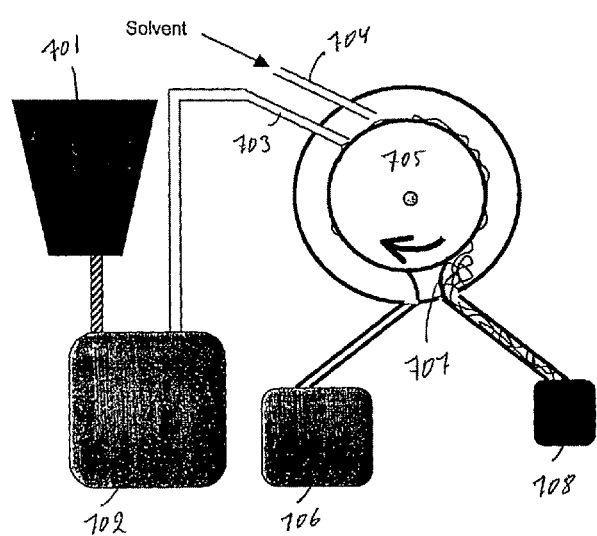
Figure 7:
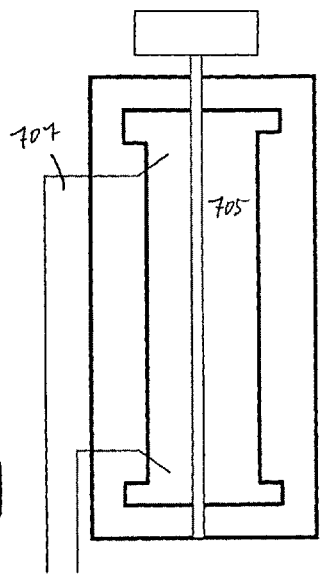

FIG. 7 A. Schematic depiction of one implementation of a device that separates magnetically CNTs or HNTs into container 706 from catalytic particles and associated amorphous carbon that go to the waste 708. B. The roller 705 and separation blade 707 of the device.

Figure 8:
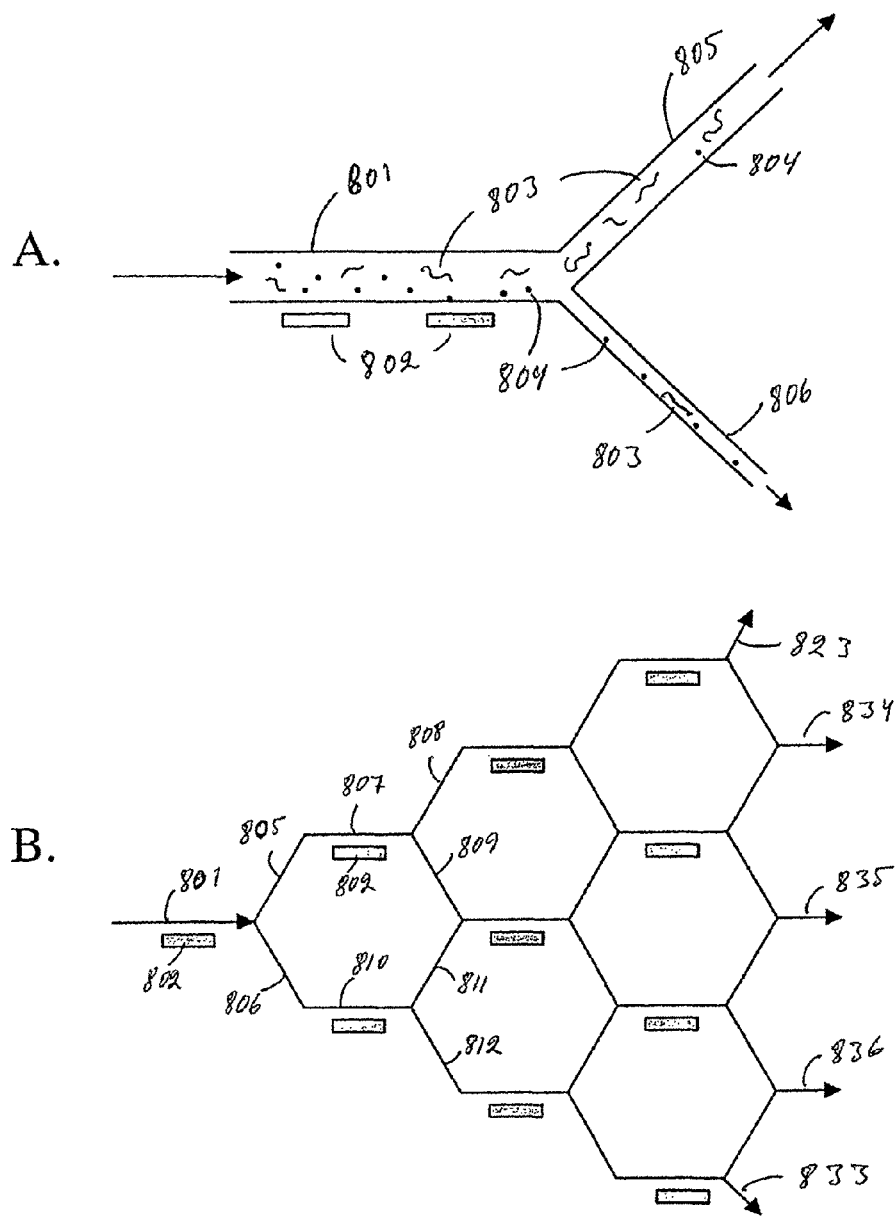

FIG. 8 Schematic depiction of one implementation of a continuous flow through device that separates magnetically CNTs or HNTs 803 from catalytic particles and associated amorphous carbon 804. A. A single Y-tube 801, 803, and 805, and magnets 802. B. The whole device.

Figure 9:
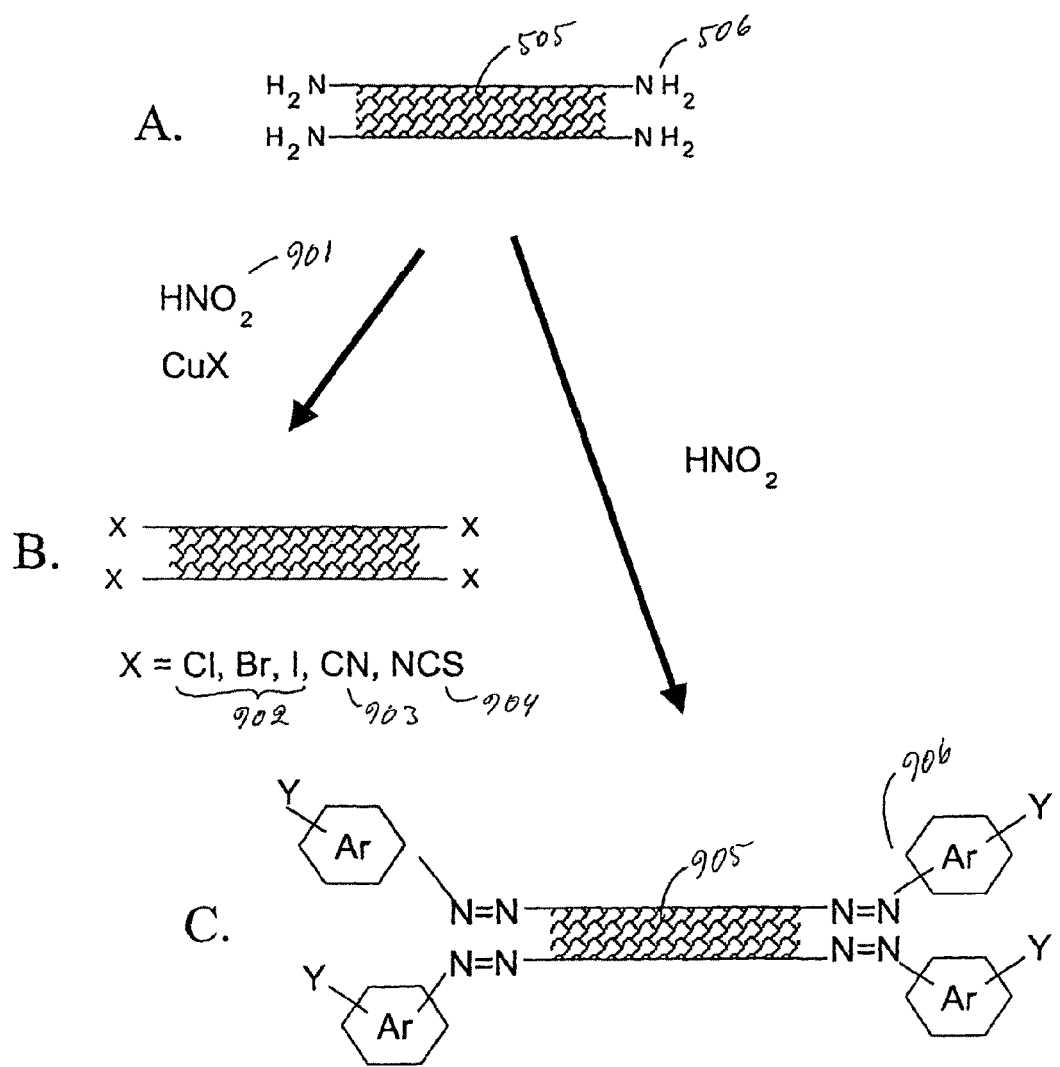

FIG. 9 A-B. Schematic depiction of the reaction of amino-terminated HNT 505 with nitric acid 901 and cupric salt. A-C. Schematic depiction of the reaction of the aminoterminated HNT with aromatic compound 906 that has substituent Y.

Figure 10:
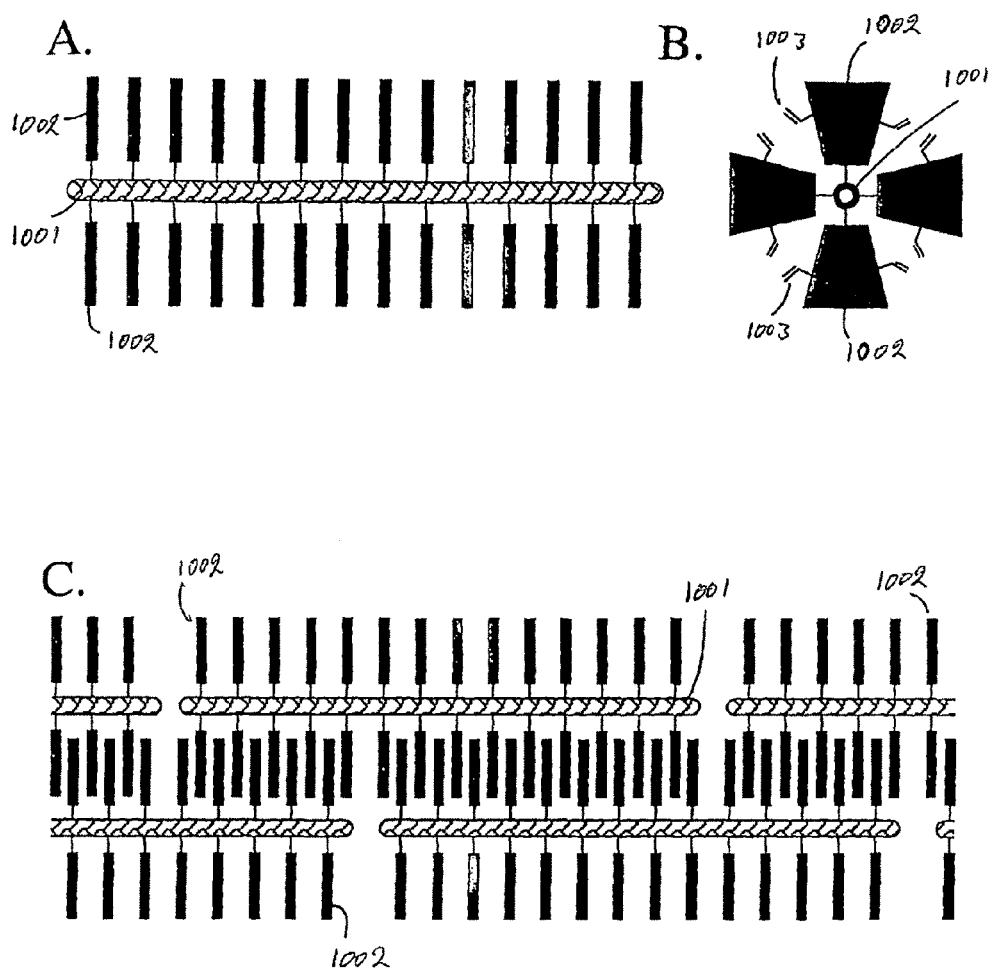
Figure 10:
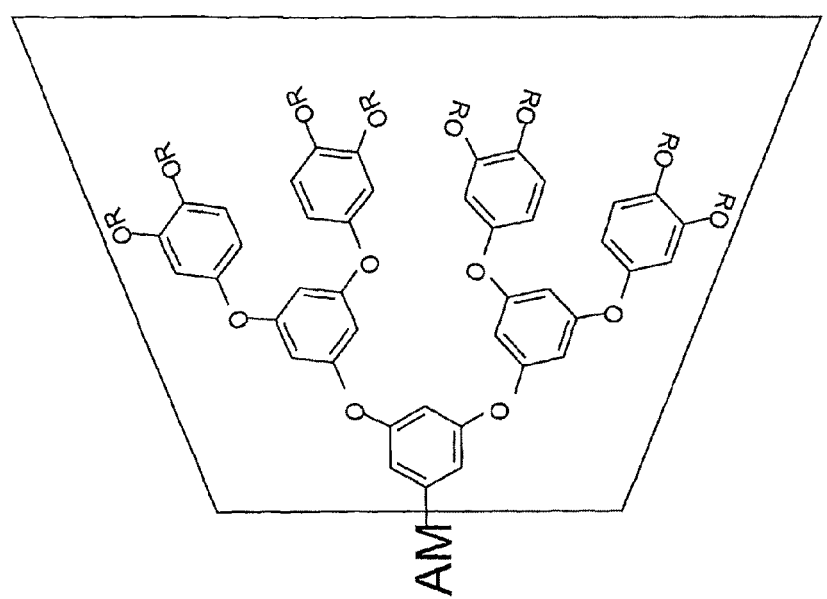

FIG. 10 A. Schematic depiction of hybride nanotubes 1001 that have side chains 1002, B. Side chains 1002 can be liquid crystalline and shape complementary. C. One possible organization of hybride nanotubes 1001. D. Bridged dendritic structure.

Figure 11:
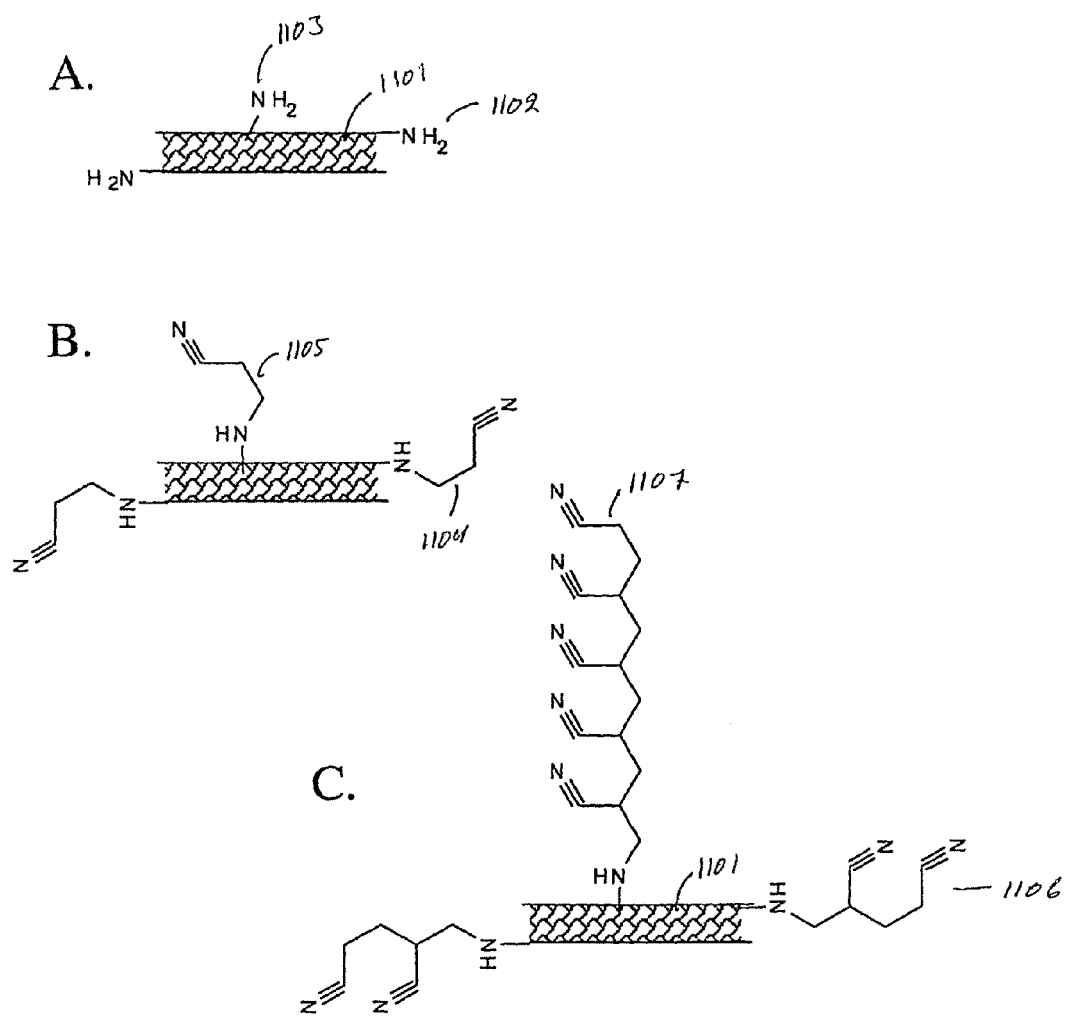
Figure 11:
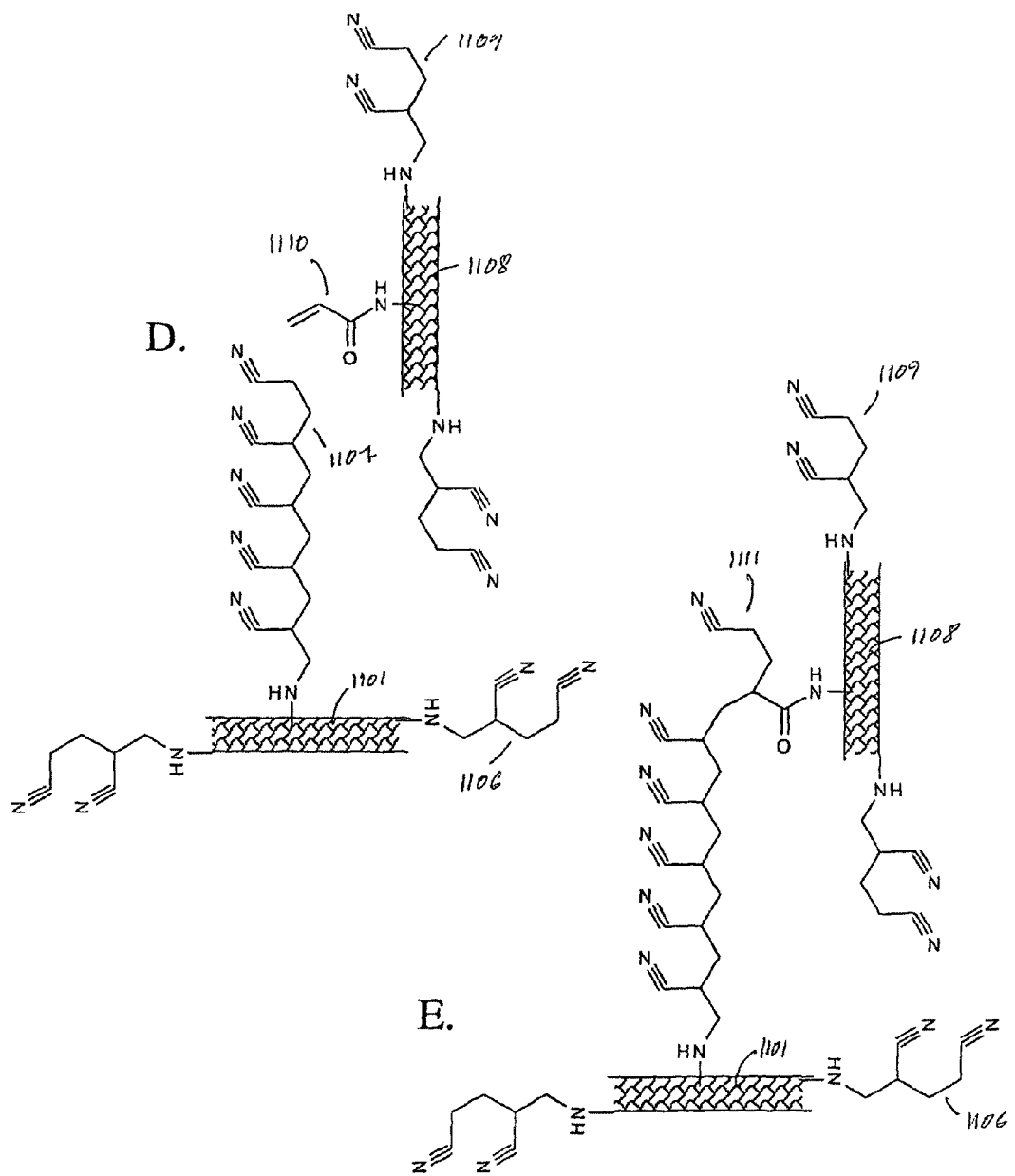

FIG. 11 Schematic depiction of polyacrylonitrile HNTs. A. Amino HNT 1101 that has amino groups at the ends 1102 and side walls 1103. B. Reaction product between acrylonitrile and amino HNT. C. Further reaction with excess of acrylonitrile and amino HNT in the presence of radical initiator or basic catalyst to produce PAN side chains 1106 and 1107. D-E. Depiction the reaction of the PAN-HNT and a HNT that contains also acryl amide functionality 1110, so that two HNTs 1108 and 1101 will be connected.

Figure 12:
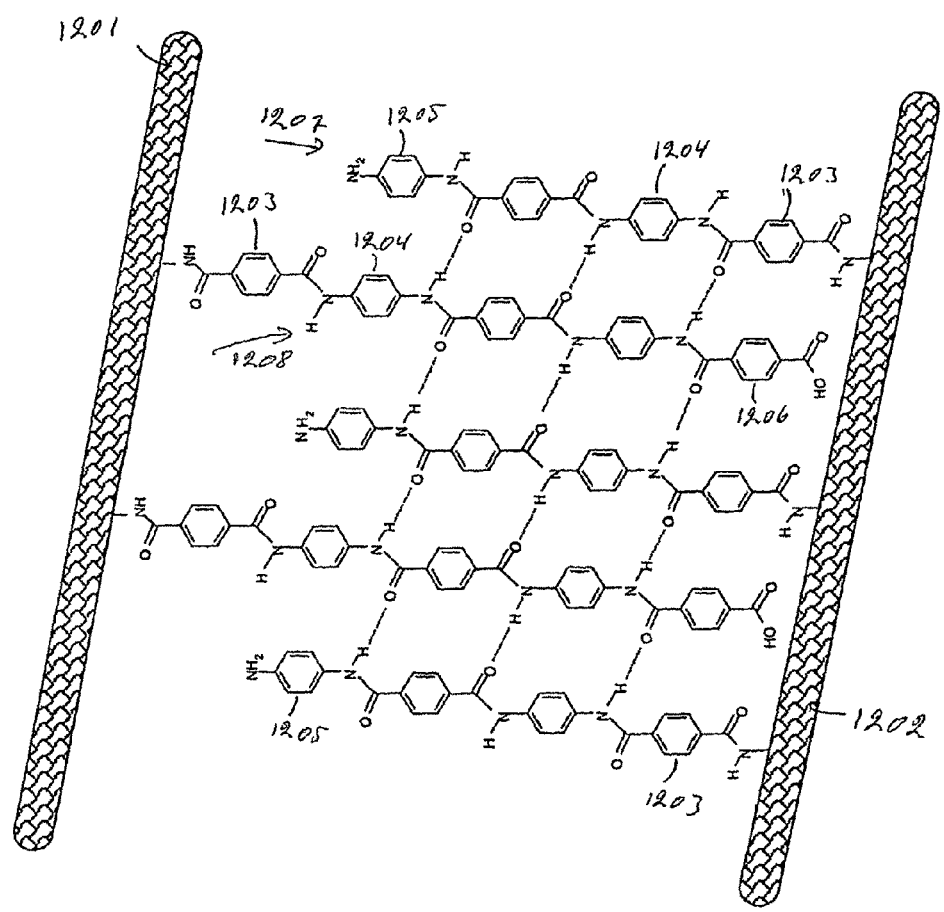

FIG. 12 Schematic depiction of poly(terephtaloyl-p-phenylene diamide) HNTs 1201 and 1202 with amino terminated and csrboxy terminated side chains 1207 and 1208.

Figure 13:
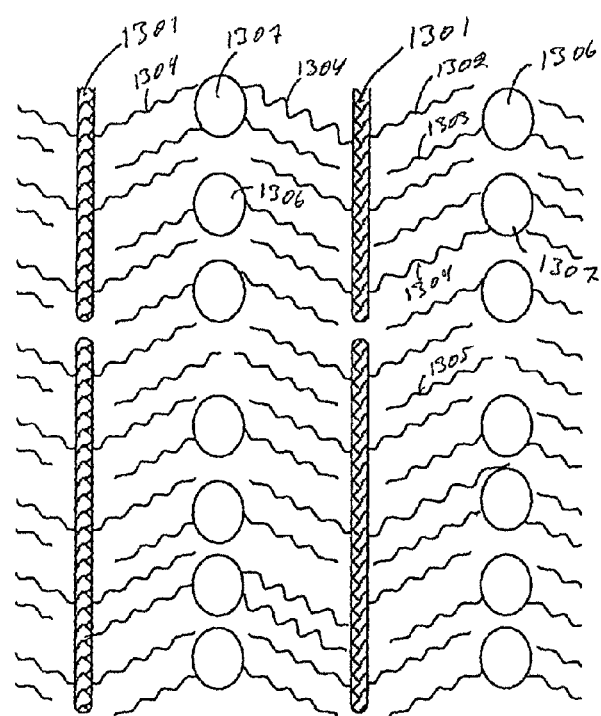

FIG. 13 Schematic depiction of one embodiment of a hybride material that has three different components 1301, 1302, and 1306 that are covalently connected. Side chains have different subtypes 1302-1305, as well as the component that is represented by an ellipse 1306 and 1307.

Figure 14:
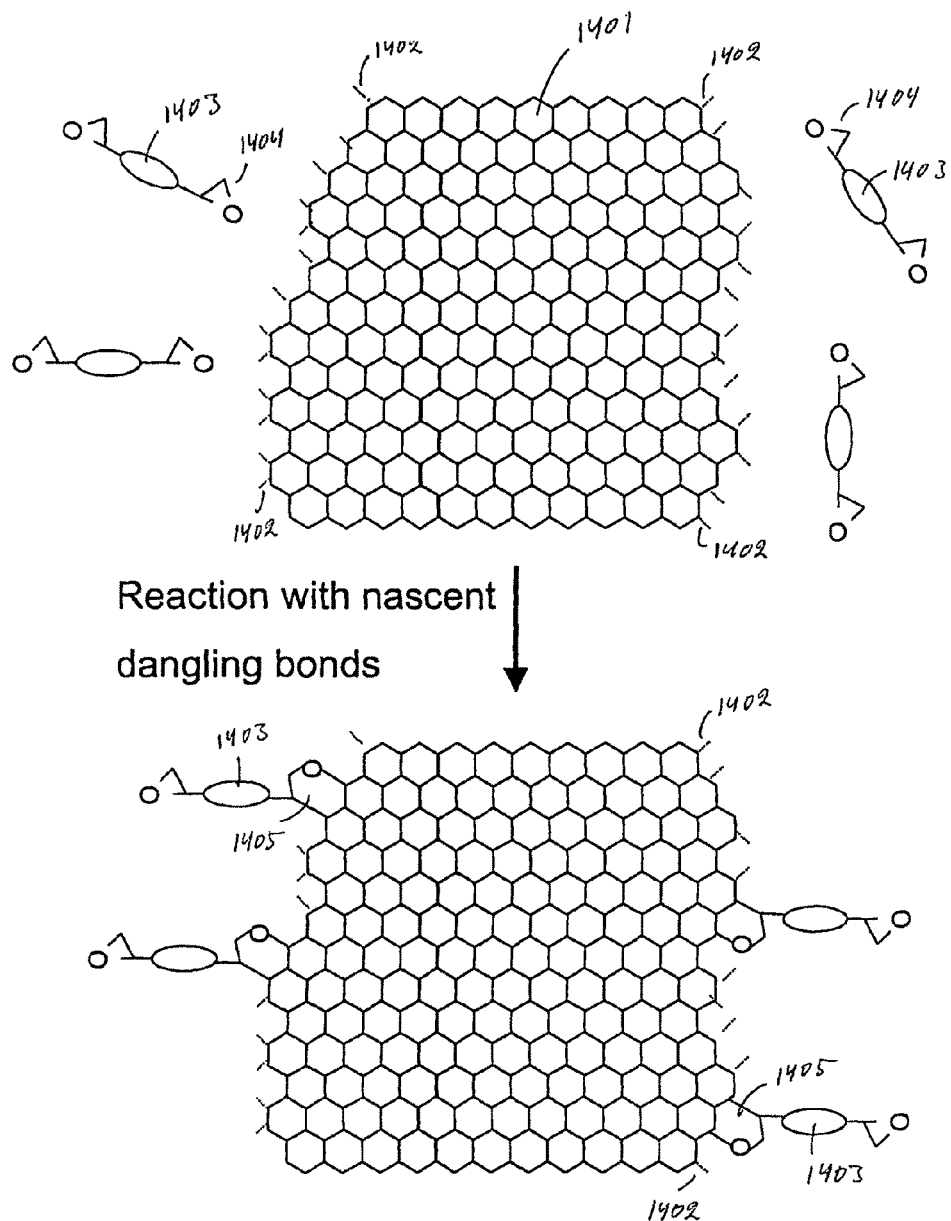

FIG. 14 Schematic representation of one of many possible reactions of bisepoxy compound 1403 with dangling bonds 1402 in a nascent graphitic edge.

Figure 15:
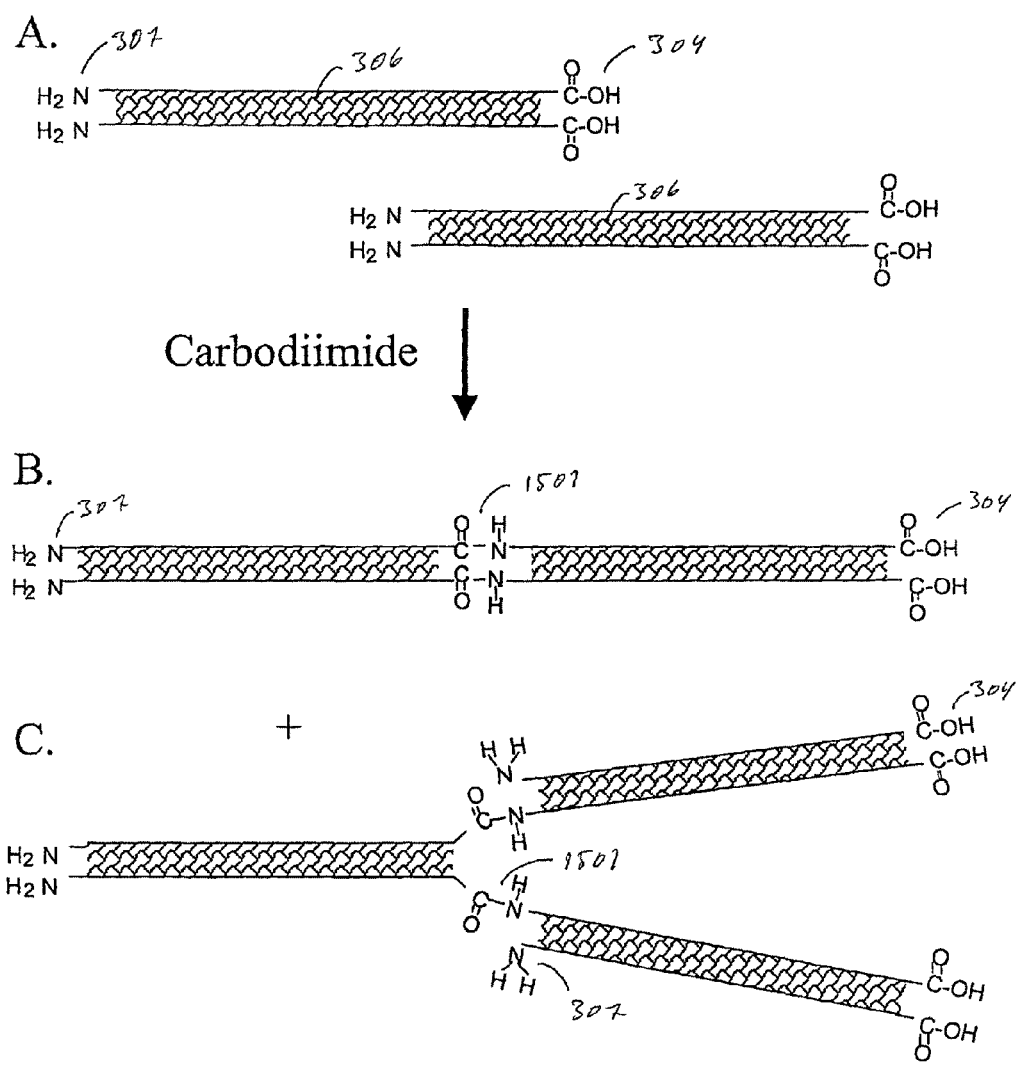

FIG. 15 A. Amino 307 and carboxy 304 terminated HNT 306. B-C. Coupling of two or more CNTs together via amino and carboxyl groups using carbodiimide so that amide bonds 1501 will be formed.

Figure 16:
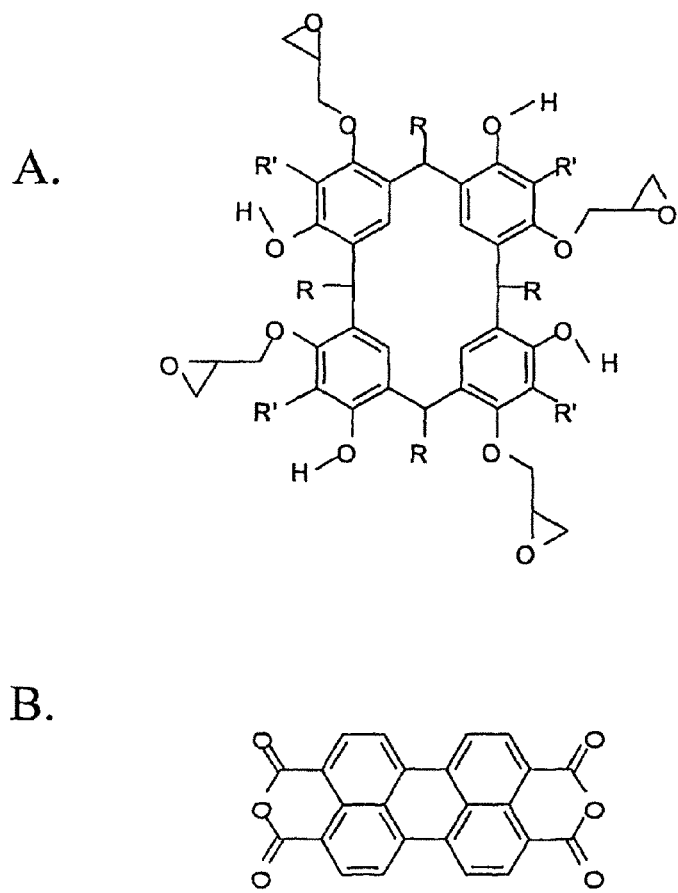

FIG. 16 A. One example of a macrocyclic compound, resorcarene, that contains multiple epoxy groups, four in this specific example. B. One example of a carboxylic anhydride, perylene tetracarboxylic acid dianhydride.

Figure 17:
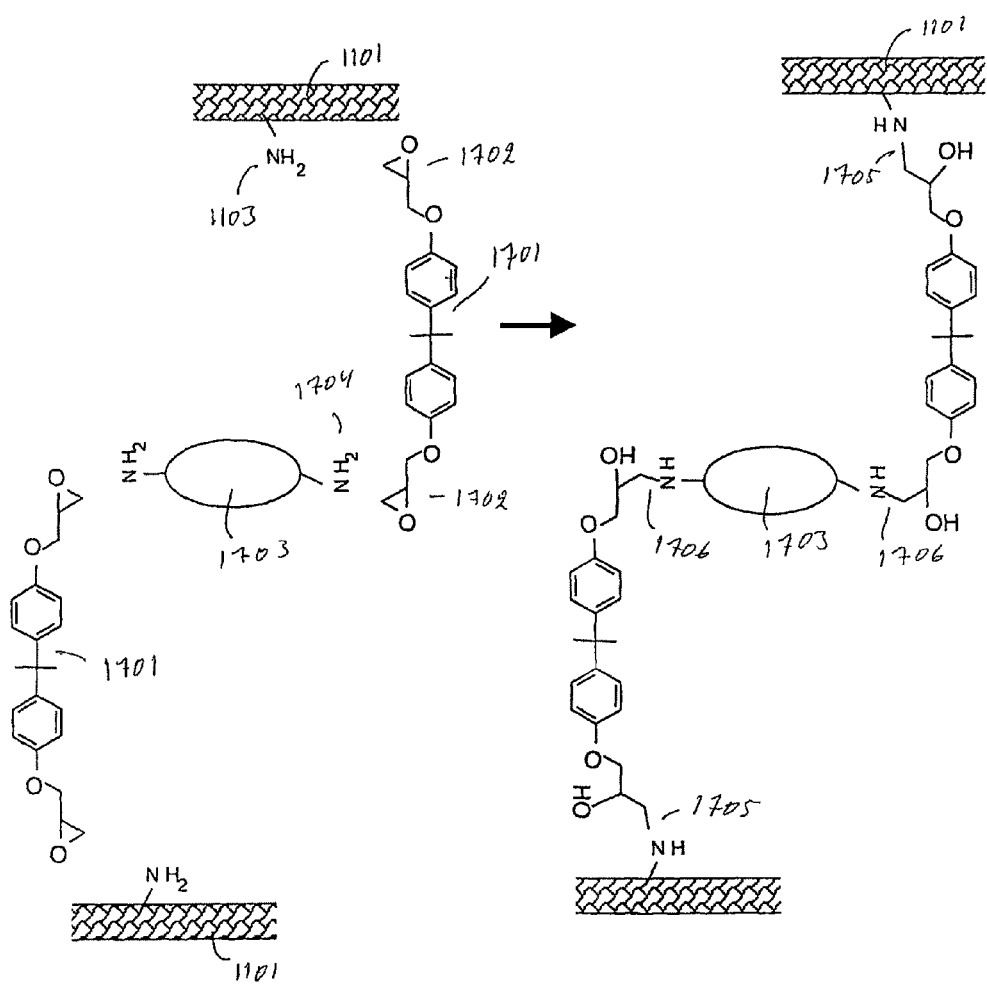

FIG. 17 Schematic depiction of the reaction of bisepoxy compound 1701 with the amino-HNTs 1101 and diamino compound or particle 1703.

Figure 18:
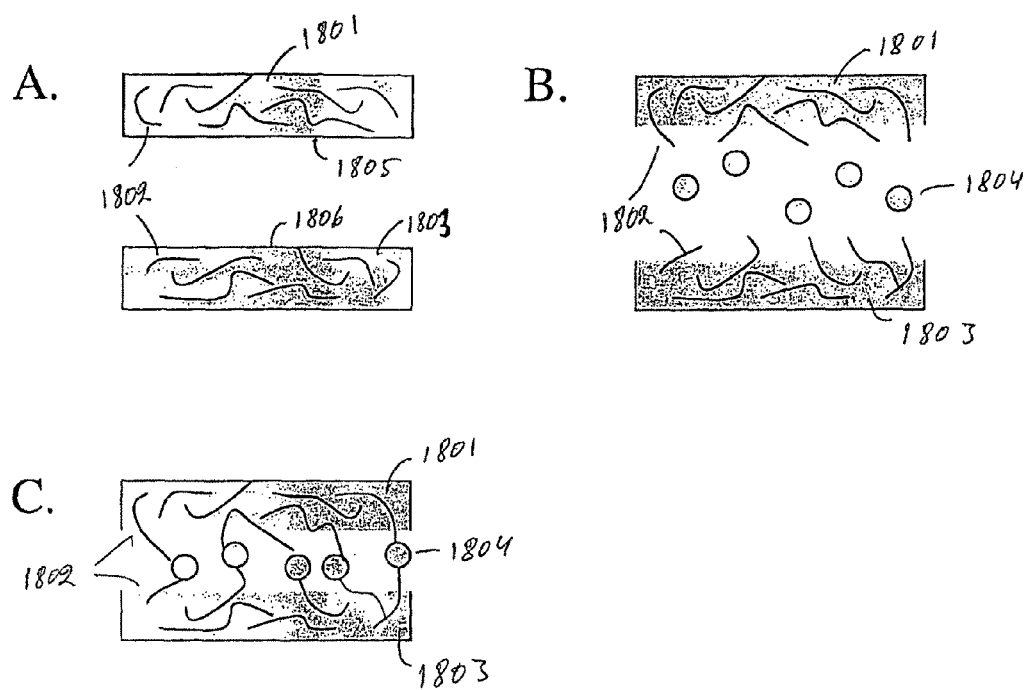

FIG. 18 A. Schematic depiction of material that contains HNTs 1802 and B. Is etched on the surfaces 1805 and 1806 in order to improve adhesion properties. C. The particles or molecules 1804 form a continuum between two pieces 1801 and 1803.

Figure 19:
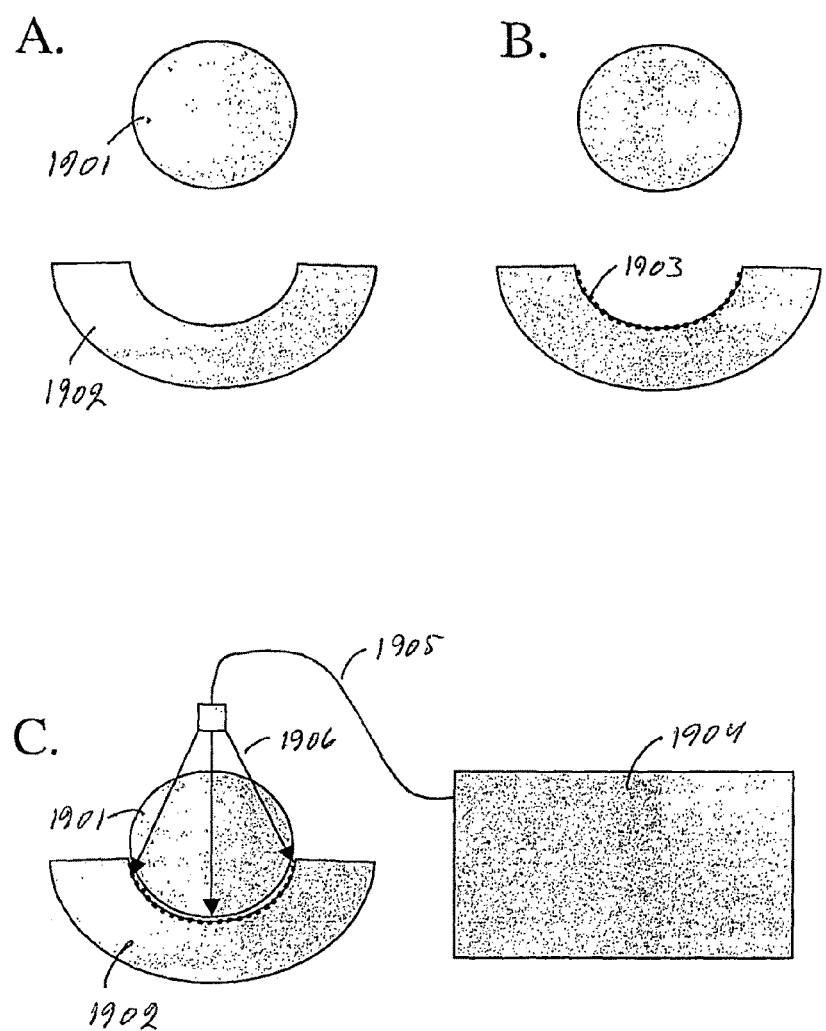

FIG. 19 Schematic depiction of two pieces 1901 and 1902 that are welded according to this invention. A. Two separate pieces 1901 and 1902. B. One surface that is being welded is covered with a linker 1903. C. The pieces are pressed together, while the welding area is heated with microwave radiation 1905.

Figure 20:
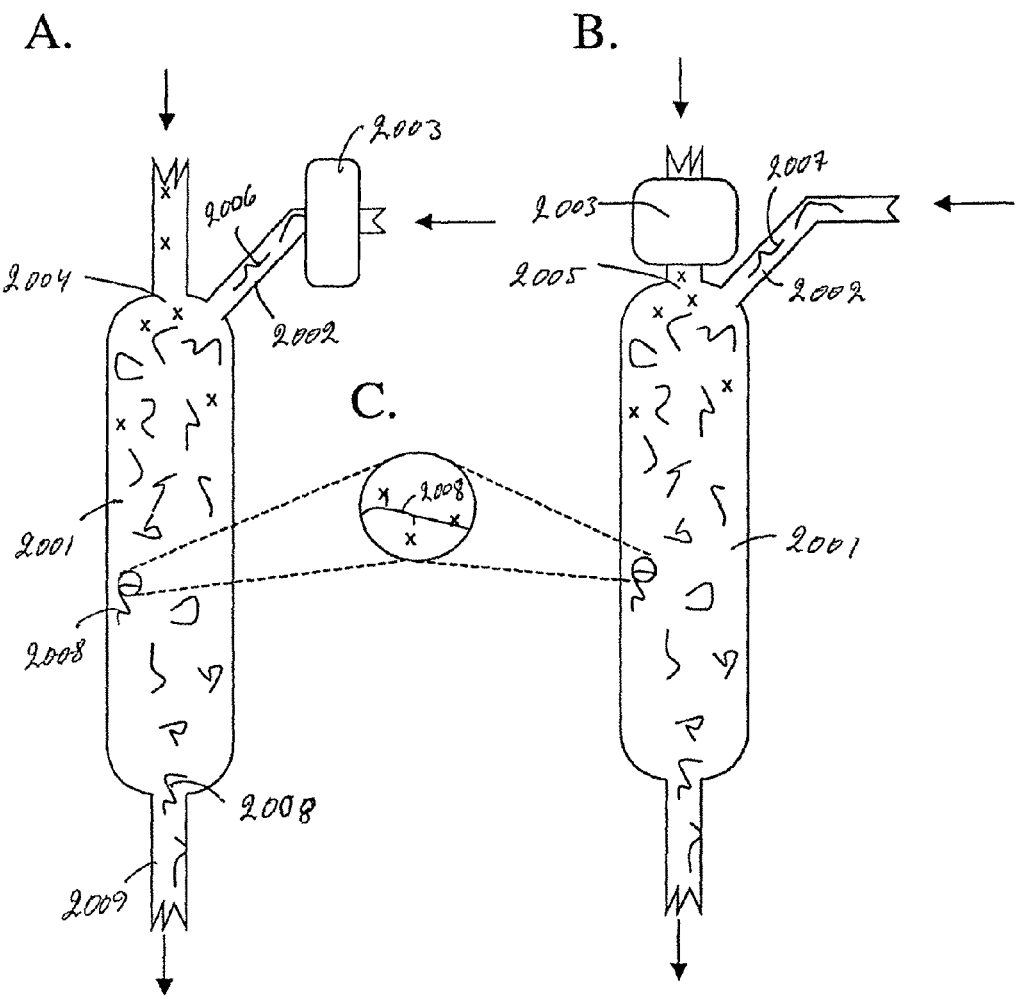

FIG. 20 Schematic representation of a gas phase reactor for the plasma treatment of the graphitic material and HNTs. A. Graphitic material 2006 is subjected to a strong electromagnetic radiation. This represents the primary reaction of this invention. B. The reactant 2005 is subjected to a strong electromagnetic radiation. The plasma reacts with the graphitic material. C. A close up one graphitic particle 2008 that has been functionalized.

Figure 21:
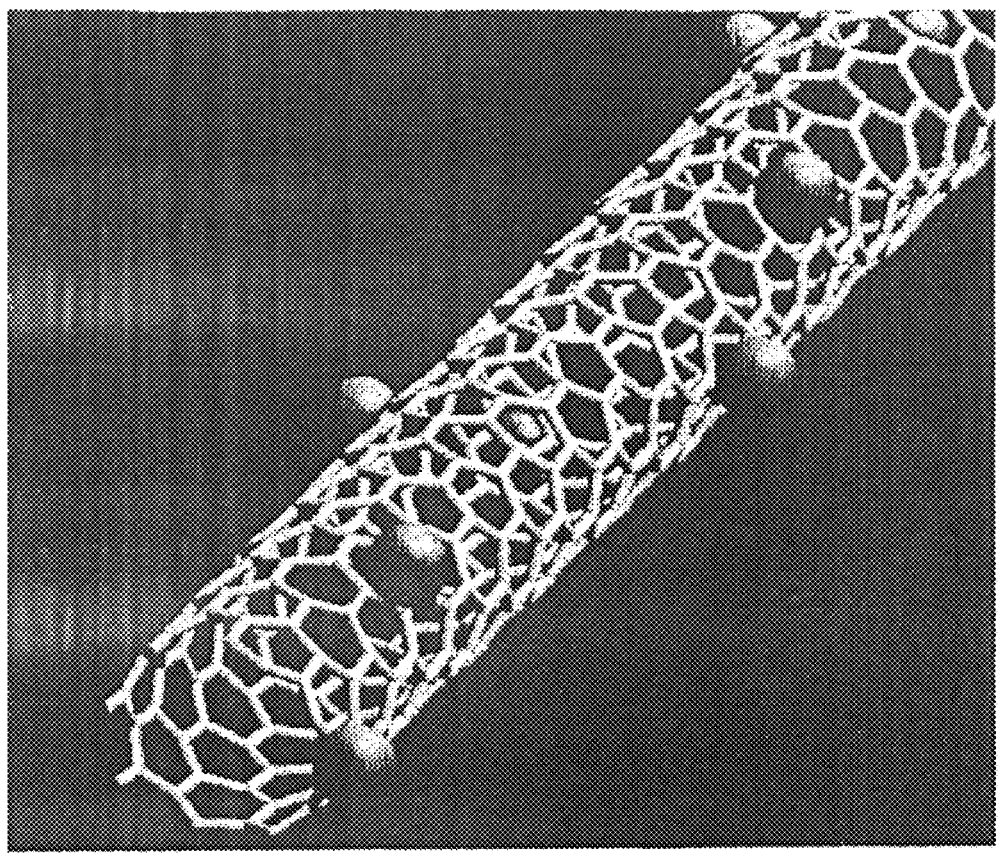

FIG. 21 Schematic representation of a HNT that has metallic nanoparticles attached (See Example 8).

Figure 22:
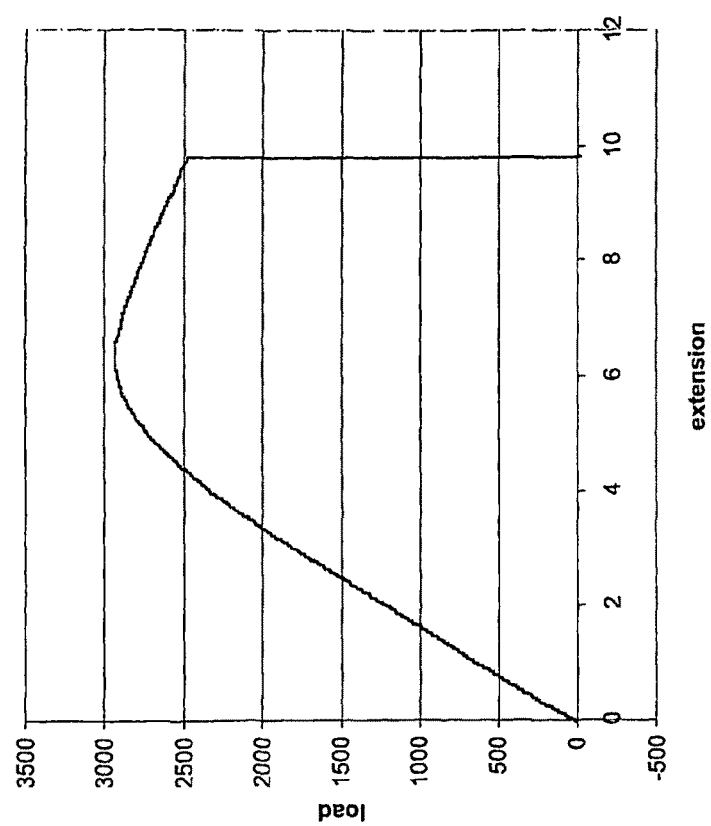

FIG. 22 The experimentally measured strain-stress behavior of the sample from Example 11.

Figure 23:
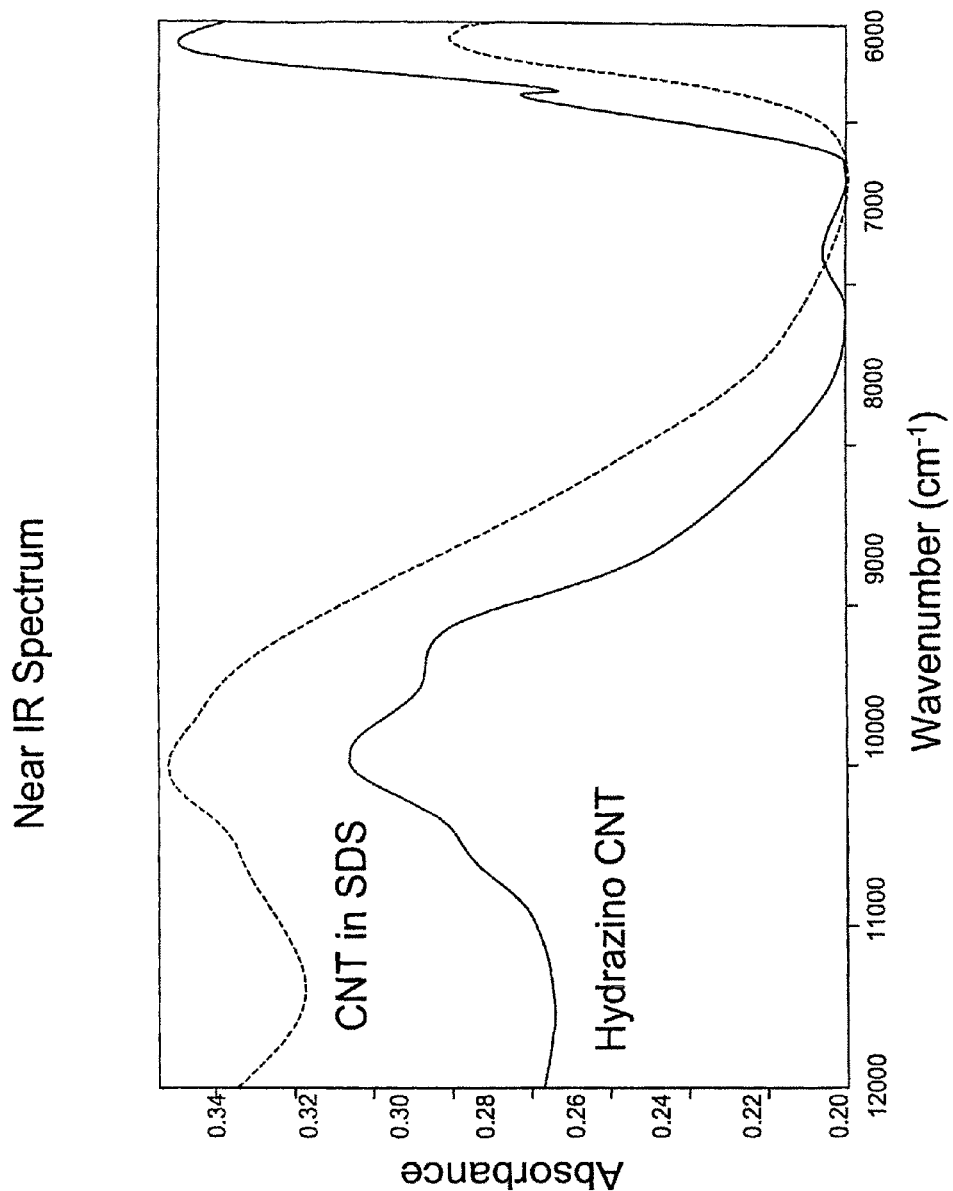

FIG. 23 Schematic near IR spectrum of the sample from Example 1.

Figure 24:
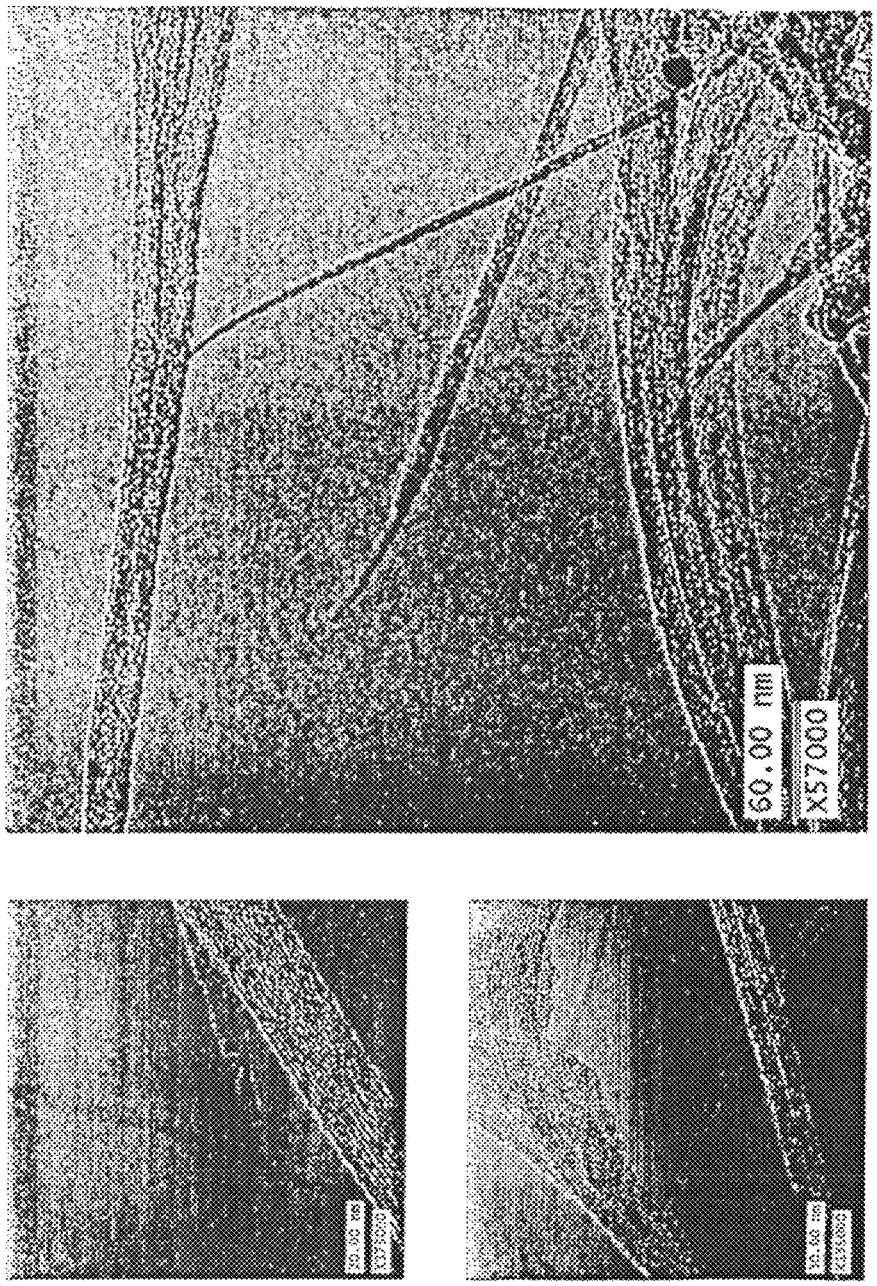

FIG. 24 SEM image of the HNTs that were reacted with hydrazine using ultrasonic tip (Example 1).

DETAILED DESCRIPTION OF THE PRESENT INVENTION

Although various processing methods of the CNTs are used as examples, several methods are applicable to graphite-like materials in general. The form of these materials can be molecules, flakes, sheets, tubes, cones, fibers, e.t.c. The common feature of these graphitic materials is that the majority of the carbon atoms form fused hexagonal rings.

The present method is based on the high reactivity of nascent or dangling bonds 104, 105, . . . , 130 (all numbers are not shown), when the graphitic material 101 is cleaved or cut into smaller pieces 102 and 103 (FIG. 1). Dangling bonds really represent radicals, carbenes, carbanions, or carbocations. Several reagents react immediately with these dangling bonds. Graphitic materials will be immediately functionalized (151, 152, . . . , 161) with the reagent 131. This is called primary reaction of this invention. The remaining dangling bonds 134, 135, . . . , 150 will reorganize, bind with the solvent or residual oxygen or water. Molecules or particles can be further connected with the graphitic network via the primary functional groups. It is an essential part of the present invention that the graphitic material itself is activated by the cutting process.

In the FIG. 1 the cutting is depicted to be performed with ultrasonic vibration. The cutting is either complete cleavage or partial rupture of the particle. The reaction rate depends also on the other reactants that are present. Some are more or less resistant towards the reactive carbon species, while some reagents are highly reactive and may actually sustain a chain reaction. Unless oxidation of the graphitic material is the purpose, oxygen must be excluded from the reaction mixture. After the primary functionalization with the methods of this invention, the chemical modification can be continued with the methods that are known in the art. While these secondary reactions as such are known, they are new in the conjunction of the primary reactions of this invention, and especially the materials are new.

The currently preferred method of this invention for the fabrication of the nanocomposite materials is based on the attachment of molecules or nanoparticles 201 onto the ends and side walls of the CNTs and other graphitic materials 202 to create HNTs and HNGs. These particles will act like anchors, and prevent the sliding of the HNTs and HNGs inside the bulk material 203 (FIG. 2). These molecules or nanoparticles can interact with various ways with the surrounding material. These interactions include mechanical entanglement, van der Waals forces, hydrogen bonds, dipole-dipole interactions, ionic interactions, and covalent bonding. Also direct cross-linking of the HNTs is possible within the scope of this invention.

HNTs and HNGs of this invention have very good electrical conductivity. However, the contact resistance between the tubes and electrodes is significant. Also the structures are fragile. Several methods of the present invention alleviate these problems. These methods include depositions and attachment of metallic or semiconducting particles between the HNTs, HNGs, and electrical contacts, cross-linking of the tubes, and chemically coupling of the HNTs with the substrate and the electrodes.

The HNTs and HNGs may contain almost any molecules and particles on their surfaces. Also inside of the HNT may have atoms, ions, molecules, or particles. These may be chemically coupled, or these entities may just be contained by the HNT.

The large molecules or nanoparticles may be attached also with the sidewalls of the CNTs. Attachment can be covalent or it may be covalent or non-covalent. For the materials applications the density of covalently attached molecules or particles should be modest, so that the integrity of the HNTs is not compromised. Non-covalent attachment can be done, for instance, by using amino groups in molecules that have high affinity for CNTs. These molecules include hydrazine derivatives, tryptophan, and related substances.

Currently preferred cutting method is sonification. Mechanical cutting that can be performed in several ways, including sharp edges, various mills, and AFM. Ball mill cutting in the presence of chemicals is well known in the art (Pierard N, et al., Ball milling effect on the structure of single-wall carbon nanotubes, Carbon 42 (2004) 1691). Ball mill involves crushing of the CNTs between two blunt objects. The CNTs can be unduly damaged in this process, and the reaction happens patchwise so that the reaction is very uneven (Pierard N, et al., Carbon 42 (2004) 1691). The methods of this invention avoid these problems. Mechanical cutting in the presence of salts or ceramics, such as sodium chloride, calcium oxalate, barium sulfate, zirconium or aluminum oxide, is sometimes preferred. Optical cutting with laser is still another alternative. Cutting can be performed under temperature control and/or in the presence of electromagnetic field. The purpose of the electromagnetic field may be the temperature control or generation of ionized species and radicals, i.e., plasma, from the reactants. For instance, oxygen and ammonia plasmas can be generated by the methods that are well known in the art. Plasma is highly reactive, and will react significantly also with sidewalls.

All graphitic materials are reactive under these conditions, although the chemical behavior of the CNTs and HNTs is mostly discussed. The curvature of the CNTs and HNTs makes them more reactive than graphite. Thus, the surface of the graphite is less reactive than that of the CNTs or HNTs. However the ends of the tubes and the edges of the graphite sheets are about equally reactive, when they are newly formed.

The frequency of sonification is preferably between 20 kHz and 1 Mhz. It must be understood that lower and higher frequencies may be applicable in some cases. Power can be continuous or pulsating. Sonification time is 5 s-10 h. These parameters will be adjusted so that the CNTs will have the desired length. The reaction vessel may contain, or be surrounded by several ultrasonic vibration sources, which may be programmed so that the interference pattern changes continuously in a controlled way. If the CNTs are cut twice, the first sonification is less powerful so that the length of the CNTs on the average at least twice the desired length of the final product. During the second sonification and in the presence of the second reactant each CNT should be cut at least once.

Sonification is preferably performed in a liquid phase. Liquids transmit the vibrational energy efficiently even, if the CNTs are not soluble into that liquid. In most applications it is advantageous, if the cut CNTs are in a solution phase. Solvents, such as chloroform, dimethylformamide, and isopropanol, are able to solubilize at least limited amounts of the CNTs. Solubility can be greatly enhanced by certain chemicals that adsorb onto the CNTs and separate them from each other. These chemicals include anthracene, pyrene, and pyrene butyric acid. We have found that 1,8,9-trihydroxy anthracene or dithranol is highly efficient solubilizing agent, because it has the ability to simultaneously interact with the CNTs and the polar solvents. In addition, it is almost planar, and will allow a good electrical contact with electrodes, if that is needed. Similarly we have found that the amino acid tryptophan is very good solubilizing agent that also provides good electrical contacts. Tryptophan can be used in conjunction of many other chemicals, and its amino or carboxyl functionalities provide further possibilities for derivatization. Some polymers, such as polyvinyl alcohol, polyethylene imine, dextran, strarch, cellulose acetate, nitrate, 1-butyl-3-methyl imidazolium cellulose xanthate. Tryptophan or its derivatives may be chemically bound with these polymers to enhance the interaction between the CNTs and polymer.

Hydrazine is extremely good solubilizing agent. Because hydrazine is reactive by itself, its use is somewhat limited in conjunction of other reagents. If hydrazine is used as solubilizing agent, a large excess of actual reagent must be used, and even then hydrazine functionalities will be created. Another class of solubilizing agents includes detergents, which are able to solubilize the CNTs into water in micellar form. Suitable detergents are sodium dodecylsulphonate (SDS), are sodium dodecylbenzenesulphonate (SDBS), tween, triton, and octadecyl trimethylammonium bromide.

When CNTs and HNGs 301 are cut in oxygen 302 or water 303 containing milieu, fenolic and carboxylic functionalities will be formed 304 (FIG. 3). This has been done previously simply, because no precaution has been taken to exclude these reactive species. The present invention allows the suppression as well as an increase of oxidation. To enhance oxidation some oxidizing agents may be added. These include hydrogen peroxide, perbenzoic acid, potassium persulfate, potassium permanganate, sodium perchlorate, and nitric acid, just to mention few examples. Also the partial pressure of the oxygen may be increased, when oxygen is the oxidizing agent. Electrochemical oxidation is another convenient alternative. In this case at least a portion of the CNTs are conductively connected with an anode during the cutting.

The present invention allows the formation of asymmetrically substituted HNTs by two stage process, in which cutting is first performed one reactant or one set of reactants, and then in the presence of another reactant 305, 405 (FIGS. 3 and 4). Both symmetric 308, 408 and asymmetric 306, 406 products will be formed. A wide variety of reactants may be used within the scope of this invention. Sheet-like graphite will react mostly in newly formed edges under similar conditions (FIG. 1).

Other oxygen containing compounds can be used as solvents. Alcohols give ethers, acetals, ketals, and orthoesters. Analogously, carboxylic acids yield esters, and acid anhydrides. Those are phenolic esters, and are easily hydrolyzed. Epoxy group is highly reactive and is advantageously used in several implementations of the present invention (FIG. 14).

Amination requires inert atmosphere and presence of anhydrous ammonia 3005 (FIG. 3), aliphatic, aromatic, or heterocyclic primary or secondary amine, such as methyl amine, ethyl amine, dimethyl amine, diaminoethane, ethanol amine, aminodendrimers that can have 8, 16, 32, or even more aminogroups in one molecule. Large excess, of the order of ten to hundred fold, of these reagents is recommended. The suitable solvents include THF, DMF, chloroform, ethyl acetate. Hydrazine 405 will produce hydrazino functionalities (FIG. 4), which can used in many applications instead of amines. However, both ends of hydrazine may react. Substituted hydrazines, such as methyl hydrazine, 1,1-dimethyl hydrazine, 2,4-dinitrophenyl hydrazine, will give corresponding substituted hydrazino functionalitites. The amino group of acyl hydrazines, i.e., hydrazides will react with the CNTs, and the attached functionality is still a hydrazide. Upon reduction the nitrogen-nitrogen bond is cut in all of these hydrazine containing moieties, and a primary or secondary amine functionality is obtained.

Thiol functionality at the end of the CNTs is often highly desirable, because it can be easily attached with gold, or silver particles or surfaces. Thiols also bind zinc, copper, lead, mercury, and cadmium sulfides, and selenides. In order to obtain thiolated ends, the cutting is preferably performed in, the presence of hydrogen sulfide 402 (FIG. 4). Thiourea provides another currently preferred alternative. The cutting may also performed in a solvent that contains sulfur, or in a molten sulfur. Carbon disulfide is a good solvent for sulfur. Some other organic solvents, such as ethanol, or tetrahydrofuran may be used, especially as mixtures with carbon disulfide. Carbon disulfide as such is a good solvent for the CNTs. It is also somewhat reactive, and can provide sulfur atoms for the CNTs.

Sulfur is used also in the vulcanization of rubber. The method of this invention can be combined with the vulcanization of polyisoprene, polybutadiene, and similar polymers. The polymer is mixed with CNT or graphitic material in a solution that contains sulfur, and the solvent is evaporated away. The CNTs or graphitic materials are cut, and the polymerization ensues. The polymerization may be facilitated by accelerators, such as diphenyl thiourea.

One of the strongest electronegative moieties is cyano group. Cyano group can be introduced at the ends or sidewalls of the CNTs by chemical modification of other functionalities, or directly by performing the cutting of the CNTs in the presence of hydrogen cyanide.

Sometimes reduction of the CNT end or the edges of the graphitic material may be preferred. That can be accomplished by catalytic hydrogenation. Palladium, or nickel nanoparticles and well as soluble ruthenium, or palladium triphenyl phosphine, or pyridine complexes may be used. Hydrides, such as sodium borohydride or sodium cyanoborohydride provide an alternative reducing agent. Electrochemical reduction is an ideal method for the CNTs and many other graphitic materials, because they are electrically conducting, and the reagent, an electron, is automatically guided to the right location from the electrode.

Borane, silane, phosphine, or arsine are reagents that can be used for the doping the ends or sidewalls of the CNTs for various electronic applications. It is often preferable to use dimethyl or diphenyl substituted borane, phosphine or arsine, and trimethyl or phenyl dimethyl silane or some other more stable compounds than the fully hydrogenated base compounds.

Carbon metal bonds can be created by cutting the CNTs in the presence of metal vapor, metal nanoparticles, or organometallic compounds, such as Grignard reagent, tetraethyl lead, dimethyl mercury, or bisphenylethyl chromium, metal carbonyls, such as iron pentacarbonyl, dimanganese decacarbonyl, chromium hexacarbonyl, or vanadium hexacarbonyl, and mixed ligand compounds, such as tris(acetonitrile) tricarbonylchromium, tris(acetonitrile)tricarbonyl-molybdenum, and tris(acetonitrile)tricarbonyl-tungsten. Metal carbon bonds that are formed onto the CNTs will allow a myriad of reactions that are well known in the art for organometallic compounds. Metal carbonyls and some other organometallic compounds decompose with ultrasound and form metal nanoparticles. In situ formed nanoparticles are very reactive, and will bind with the CNTs both at the ends and the walls. Depending on the concentration of the components various structures may be formed. At high concentrations three dimensional networks or wires can be fabricated. Flow or electric field may be used to assist the formation of oriented structures, such as wires.

The list of the possible reactions is very long. The cutting of the CNT and other graphite-like materials is very drastic procedure, whereby carbanions, cations, radicals, and carbenes are formed. When the creation of these species is more or less mechanical these reactive species can be called mechanocarbanions, mechanocations, mechanoradicals, and mechanocarbenes. Ultrasonic treatment gives correspondingly sonocarbanions, sonocations, sonoradicals, and sonocarbenes, and the light fotocarbanions, fotocations, fotoradicals, and fotocarbenes In each of these cases is differentiating factor is the frequency of the cutting force that will lead to different outcome in each of these cases. The primary products of the cutting are extremely reactive species and will combine virtually with any molecule that is nearby. One corollary is that it is very difficult to obtain only one product. However, the goal is often to get at least one desired functional group or moiety onto the end or the sidewall of the CNT. Because there are several reactive carbon atoms, often at least ten at the end, one or more will gain the wanted functionality, if there is an excess of the reagent available. Sidewalls may have strong bends that do not lead to a complete cut of the CNT, but render that spot temporarily more reactive than the unperturbed sidewall. These reactive spots may be created transiently along the CNT wall during cutting. Reaction may happen either outside or inside the wall.

Some of the reagents are bifunctional in the sense that they can react twice either in the same way, or two different ways. For example, hydrazine can react from both ends (FIG. 5). If both reactions happen with one CNT, a cyclic compound is obtained 503. However, often hydrazine is used in order to make amines, and upon reduction both ends of hydrazine will yield an amino group 506 (FIG. 5B). Under oxidative conditions azo, nitroso, or nitro 508 functionalities will be formed (FIG. 5 C). More interesting case happens, when hydrazine or some other bifunctional molecule binds two CNTs together 504. This actually quite common, because the CNTs are mostly in bundles, and thus in close proximity. Several CNTs can be bound together in star like formation, or rather resembling a hedgehog in tree dimensional space. These kind of structures are useful in creating stronger materials, and also nanoelectronic circuits. In three dimensional space these structures could mimic dendritic structure of a brain cells. CNTs could be bound also as bundles so that HNT bundle is formed.

The cutting can be performed in the presence of monomers, such as acryl amide 603 (FIG. 6 B), dimethyl acryl amide, acrylonitrile, methyl methacrylate, acrylic anhydride, maleic anhydride, acryloyl hydrazide, styrene, and vinyl chloride. The radicals that are formed during the cutting will initiate the polymerization, and the growing polymer chain is automatically attached with the ends and/or side waals of the HNTs and NHGs (FIGS. 6 A and B). Cross-linking of the chains 604 can be accomplished by bifunctional monomer, such as bisacrylic amide 605 (FIG. 6 C). Thus, various composites can be easily be prepared. Known polymerization catalysts, such as Ziegler-Natta catalyst or titanocene, may be used to facilitate polymerization, and also affect the stereochemistry of the polymer.

Although the ends are highly reactive during the cutting, the sidewalls will also react in many cases. The functionalization of the sidewalls is often desirable. For instance, cross-linking with epoxy compounds is more efficient, if the side walls contain amino or epoxy groups (FIG. 17, Example 11). If the side wall derivatization is not wanted, the mechanical cutting with sharp crystals is preferred over ultrasonic cutting. Sharp crystals should have nanoscopic edges. Also the temperature may be lowered, and modest amount of radical scavengers may be added.

One important aspect of the present invention is that the original structure of the CNTs is well retained in the HNTs even, when the degree of the substitution is fairly high (Example 1 and 3). The near IR spectrum recorded from the sample of Example 1 demonstrates that the electronic structure is well preserved, because the absorption bands do not shift or disappear completely (FIG. 22). In most functionalization methods that are known in the art, these near IR bands disappear almost completely, because the CNTs have been extensively damaged.

If solvents are used they should be as inert as possible. Solvents include, but are not limited to aliphatic hydrocarbons, such as heptane, cyclohexane and decalin, aromatic hydrocarbons, such as benzene, perfluorocarbons, tetra-hydrofurane, diphenyl ether, benzophenone, and hexamethylphosphoramide.

Purification Methods

The asymmetric HNT product contains often HNTs that have different lengths. For many applications it is desirable to fractionate the product so that the size distribution is minimized. Fractionation methods include centrifugation, electrophoresis, especially if one or both end groups are charged, dielectrophoresis, and size exclusion chromatography, or gel filtration. For electrophoresis purposes electrically charged molecules or particles can be attached onto one or both ends of the HNTs. These molecules include sulfonate, carboxylic, trimethylammonium, and other corresponding derivatives of aromatic hydrocarbons. Dendrimers provide a method to attach a large number of charged groups onto the ends of the HNTs and HNGs.

The chemical derivatization method of this invention can be combined with a magnetic purification method. The magnetic purification device has a chamber, in which the HNTs are cut loose out of amorphous carbon and catalytic particles. The atmosphere and the solvent in the chamber may contain the reagents that are needed for the derivatization of the ends or the sidewalls of the CNTs or HNTs. The optional further cutting induced derivatizations may be performed with the same device even, if the magnetic purification may not be necessary.

The essence of the purification method of the present invention is the simultaneous removal of both catalytic particles and the amorphous carbon by a magnetic field. Because the catalytic particles that are also ferromagnetic are inside the amorphous carbon, both impurities are removed at the same time and without any harmful chemicals, such as hot mineral acids, or other harsh conditions, such as high temperature oxidation.

During fabrication the CNTs are attached with the catalytic particles and/or amorphous carbon. The CNTs must first be detached from these components. This process can be performed for the dry powder, or the CNTs can be solubilized. Any method that is known in the art can be used. These include mechanical milling, sonification, and oxidation. Currently, sonification is preferred. The sonification is most effectively performed, if the CNTs are first or simultaneously solubilized.

Solubilization and sonification are advantageously performed simultaneously. The HNTs will be separated by the combined effect of the solubilization agent and the sonification. Sonification also cuts the HNTs so the they will be detached from the amorphous carbon. Depending on the sonification time and power output, the HNTs will be cut several times so that they will become progressively shorter. The desired length of the HNTs depends on the application. If the HNTs are spun into macroscopic fibers, or electrical wires, the length will often be maximized. In several other applications, including many sensors, and nanoelectronic applications, short HNTs will be preferred. In this context short is about 50-200 nm and long is several or tens of micrometers.

The mass of the solubilizing agent is advantageously at least half of the mass of the CNTs, and up to hundred fold. The concentration of the fabricated HNTs in the mixture is preferably between 0.1-5%. The present method works with all feasible solubilizing agents, solvents, and concentration ranges.

After the HNTs have been detached from the amorphous carbon, and the catalytic particles, the mixture is subjected to a magnetic field. The process can be performed either as a bath operation, or in a flow cell (FIGS. 7 and 8). Magnetic field can originate from an electromagnet, or permanent magnet. Currently, a permanent magnet, including NdFeB magnet, is preferred. The magnet can be located inside or outside of the vial or tube.

The magnetic or magnetizable material can be iron, nickel, cobalt, NdFeB, magnetite or any other magnetizable material. Magnetic material that is inside of the purification chamber is advantageously coated with some corrosion resistant material, such as plastic, glass, ceramics, gold, or platinum. Plastic must be chosen so that it is resistant to the solvent that is used in the process. Suitable plastics are, for example, tetrafluoroethylene (Teflon), polyimide, polyvinyl chloride, polyethylene, and polypropylene. Glass coating can be done by filling a class tube partially with powder, or larger magnetic pieces.

When a powder is used the tubes can be heated and pulled into thin capillaries. These capillaries can be further coiled, or alternatively cut into short pieces. Magnetic material can also be mixed with molten glass, and after cooling the glass is ground into small pieces. These can be again mixed with molten glass that can be again ground. The glass transition temperature of the glass used in the second round can be lower than that of the glass used to coat the magnetic particles at the beginning. After the glass is ground again, it may be washed with mineral acid to remove any exposed magnetic material. Ground glass may be sintered into proper shape, and sintered glass used as such. Gold coating of nickel particles is best performed by pouring nickel powder in to a gold chloride solution with good mixing, and separating the gold coated nickel particles by filtering. Uncoated particles, coated particles, as well as capillaries, or fibers containing magnetizable or magnetic particles can be further mixed with a filler material, such as cellulose, plastic, glass, or nonmagnetic metal. Filler material must be processed so that it is porous, or contains holes, or capillaries so that the HNT solution or suspension can flow through. Currently a filter paper is preferred. Paper is inert towards all relevant solvents, and it is economical. Pore size in a paper can be adjusted from about 100 nm to about 100 micrometers. Particles can be easily mixed with cellulose or pulp, and the slurry can be molded in a shape of a cup. Cup shape is advantageous, because the crude HNT will stay in place, when the filter is placed inside the starting vial. Also the solvent can not penetrate between the filter and the wall of the vial, if the filter has high enough wall.

The filter can also contain macroscopic permanent magnets, such as 1 mm$^3$ magnets. Alternatively, it may contain macroscopic pieces of magnetizable materials, such as iron wire.

Paramagnetic particles, such as polystyrene (PS) particles that have magnetite core, can be mixed with crude HNT. PS particles can be used, when the water is the main solvent, and HNTs will be coated with a detergent. These PS particles should be coated so that they remove at least one impurity. For example, they may have EDTA derivative covalently attached so that they bind catalytic particles and the ions that will be dissolved from those particles. They can also bind hydrophobic particles, such as fullerenes, but not HNTs that will be better coated with the detergent.

In a more advanced form of the present invention a flow through system will be used (FIGS. 7 and 8). The whole process can be automated to the point, in which crude HNT material is put into a starting container, and the end product is collected from another container either as a solution or dry powder. One example of this kind of device is a column, which contains rods that are magnetic or can be magnetized from outside. On the top of the column is a cap that has fairly large airspace. When the cap is taken away the upper parts of the rods will be exposed, and the rods can be pulled out manually.

One example of a continuous, and automatic systems are depicted in FIG. 7. This is based on a magnetic wheel, or roller. Especially, a roller device (FIG. 7) can have industrial scale production capacity. The solid starting material is originally in the container 701. It is added into a mixing chamber 702, where it is solubilized and possibly reacted with the reagents that may be added simultaneously. There is no need that the wheel or roller 705 is totally magnetic. On the contrary currently preferred embodiments are such that there the magnetic and nonmagnetic areas are about equal. This will facilitate the removal of the magnetic particles from the wheel or roller by a blade 707 into the waste container 708. The solvent that is coming from the tube 704 will rinse CNTs and HNTs from the surface of the roller down to the collection container 706.

Another currently preferred embodiment is in FIG. 8 A, in which the CNT or HNT suspension 803 flows in a Y-shaped tube 801, 805, and 806. At least one powerful magnet 802 is on one side of the tube, and magnetic material 804 will be pulled onto that side 806, while the suspension of the CNTs or HNTs 803 is flowing in the other side 805. The separation is not perfect, and some magnetic material 804 will go to tube 805, and some graphitic material 803 will go to tube 806. The process can be repeated several times, and a separation network can fractionate the CNT suspension continuously (FIG. 8 B). The second Y-tube (807, 808, 809) and the third Y-tube (810, 813, 812) are connected with the first Y-tube and with each other. The same principle can be repeated several times. The fractions are collected from outlets 823, 833-836. The best purified material comes out from the tube 823, and the material that contains most of the magnetic particles will come out of the tube 833.

Fractionation of the CNTs or HNTs based on their diameter is enabled by the ring molecules that have a certain diameter. A set of ring molecules that have inner diameters ranging from one nanometer about ten nanometers can be used to accurately separate the CNTs or HNTs that have different diameters. The CNTs are virtually insoluble in i-propanol, for instance. If ring molecules that have an inner diameter of one nanometer are added, and the mixture is sonicated, the CNTs the have the outer diameter less than one nanometer will be coated with these molecules, and they will be solubilized. The solution is separated from the insoluble CNTs, which will be treated with new ring molecules that have slightly bigger diameter, for example 1.2 nm. Now the CNTs that have the diameter between 1 and 1.2 nm will be solubilized. The process can be continued as long as larger ring molecules are available. The difference in the diameters can be made so small that relatively small number of different CNTs will be available and fit into a given ring molecule. Thus, metallic and semiconducting CNTs can be separated.

Additional Derivatization

The present invention provides means for the selective primary derivatization of both ends and sidewall with different molecules or particles. Because each of these parts of the CNT can be functionalized differently at the first step to give HNTs, there is an enormous amount of various combinations for the further secondary functionalizations. Several different chemical moieties can be attached with the HNTs of this invention. The moieties include polarizable, luminescent, magnetic, electrically conducting, electron donating, and accepting molecules as well as biomolecules. These moieties make possible the fabrication of conductors that are sensitive to external stimuli such as light, temperature, and chemicals, and biochemicals. Also fabrication of solar cells is enabled.

Because many HNTs and HNGs of this invention are quite large particles, their further functionalization can be considered to be heterogeneous reaction. These reactions can be facilitated by ultrasonic vibration as is well known in the art. The use of ultrasonic vibration in this second step is fundamentally different form the primary functionalization of this invention. The primary functionalization would not happen at all or would happen extremely slowly without ultrasonic vibration.

The CNTs or HNTs can be coupled with micro- or nanoparticles during sonication, or afterwards using the newly created functional groups to form new HNTs. For instance, a polystyrene particles that have one HNT, or tens or hundreds HNTs on their surface can be produced. A new sonication will cut the CNTs or HNTs and expose a new functionality that is determined by the reagents that are present during the cutting. Now a different micro-, nanoparticle, or molecules can be attached onto the exposed ends of the CNTs or HNTs.

Cyclocondensation reaction with 1,3-diketones can transform hydrazino groups directly into pyrazoles (*Indian J. Chem. Sect B* 32B (1993) 986). Because hydrazine group can have at least one aliphatic, aromatic, or heterocyclic substituent, and the diketone can have two different substitutents, there are enormous number of combinations that are possible.

Amino and hydratzino groups can be alkylated or acylated. Alkyl-, and benzyl halogenides, and α-halogeno aldehydes and ketones, both unsubstituted and substituted ones are well known alkylating reagents. Examples of specialty reagents that have important applications are cyanuric chlorides and N,N,N',N'-bis(pentamethylene)chloroformamidinium hexafluorophosphate. Myriad of aliphatic and aromatic acid halogenides anhydrides and activated esters can be used to form amides or hydrazides. These and other condensation and substitution reactions of amino groups are well known in the art.

Still another reaction of amino groups that has a wide variety, is the synthesis of diazonium salts using nitric acid 901, which can be converted corresponding halogenides 902, cyanides 903, or isothiocyanates 904 (FIG. 9 B). Diazonium salts react with many aromatic compounds forming aromatic azo compounds 906 (FIG. 9 C).

Quantum dots can be attached with the CNTs. Quantum dots should preferably be coated by insulating layer, so that the quenching effect of the CNTs is largely avoided. For instance, cadmium selenide or sulfide particles can be coated first with zinc sulfide, and second with avidin or some other protein. Biotin can be conjugated with the CNTs so that avidin coated particles will bind strongly with the CNTs. Europium oxide nanoparticles can be coated with aluminium or niobium oxide and then with polylysine that can be conjugated, for example, with formyl-L-tryptophan covered CNTs, or alternatively with amino group functionalized CNTs by using dicarboxylic acid spacer, such as succinic acid. Quenching of quantum dots can also be avoided by hydrogenating of the aromatic system of the HNT. Thus, aromatic carbon atoms are transformed into aliphatic carbon atoms that do not absorb UV/Vis light.

The CNTs that are conjugated with polarizable and/or dye molecules have especially important applications. These include tags for bioanalysis, light harvesting antennas, electrical conductors that are sensitive to light, or chemicals. Also these molecules represent one manifestation of Little's polymer that was proposed already 1965 as a potential room temperature superconductor. Little's polymer has essentially one dimensional conductor that is surrounded by polarizable side chains. Polarization of the side chains stabilizes Cooper's pairs, instead of phonons as in conventional superconductors. Example of an polarizable moiety is 4-[4-(dimethylamino)styryl]pyridium cation that can be chemically bound with the CNTs that have chloro- or bromomethyl groups on their sidewalls. Many commercially available cyanine dyes, such as merocyanine, 3,3'-bis-(4-sulfobutyl)-1,1'-diethyl-5,5',6,6'-tetrachlorobenzimidazoly; carbocyanine potassium salt, have sulfonate functionality.

Some molecules or moieties can be inside the tube. They may be covalently coupled or have some weaker interaction. They are in any case well confined. Ions and metal atoms are one important class of particles that may be inside the HNTs. Currently metal ions, such as gold, silver, copper, chromium, and platinum ions, are preferred, and gold is most preferred. These metal ions interact with the inner π-electron cloud of the HNT. They are also easily polarizable ions. Thus, the first hydration shell can be, at least partially, be substituted with the HNT itself. Other metal ions, such as alkali and earth alkali metals are also possible, especially in a non-aqueous milieu.

Several ligands can be attached with the metal ions. The metal atoms are solvated by the solvent that is used in the fabrication process. The solvent may be water, N-methylformamide, alcohol, such as methanol or ethylene glycol, or some other polar solvent. With less polar solvents an additional ligand, such as crown ether, triphenyl phosphine, or cyclopentadiene may be advantageous. When the metal ions enters inside the HNT some of the ligands may be removed and the HNT acts like a ligand, and can actually replace several, for example, four ligands.

The metal atom or ion and its ligands that are inside and the substituents, such as hydrazine and molecules that are associated with it that are outside can jointly form the polarizable entity that will assist the formation of Cooper pairs according to the models of Little and Ginzburg (Ginzburg and Kirzhnits, High-Temperature Superconductivity, Plenum Publishing, 1982).

One important modification is hydrogenation of the HNTs or other modified graphitic materials, so that most or all of the structure is converted into aliphatic form. Although electrical conductivity is lost, and the thermal conductivity is diminished, the flexibility is improved. Also the color, and transparency might be more desirable for some applications. Many functionalities tolerate the hydrogenation, but some, such as nitro group, may be hydrogenated, too. Sometimes that is desirable, but not always. Protective groups may be needed, or groups may be transformed after hydrogenation into the desired form. Many of these methods are well known in the art, and can be found in standard chemistry text books.

Liquid Crystalline and Polymeric Side Chains

Functional groups, such as amino and thiol, can be easily grafted by side chains. One important group of side chains consists of moieties that are able to form liquid crystalline structures. These have typically an aromatic or heteroaromatic moiety and an aliphatic spacer. Aromatic moiety should be somewhat elongated, for example, the length is preferably three times the width. Some examples are biphenyl, stilbene, azobenzene, azoxybenzene, anthracene, pyrene, and metal phtalocyanine. Aromatic groups can also be connected by acetylenic, or azomethine bond. Preferably an aliphatic moiety or moieties, such as hexyl, cyclohexyl, octyl, iso-octyl, dodecyl, 1-carboxyhexyl, are attached with the aromatic ring system either directly or via some functional group, such as ether, amino, amide, or ester bond. Chiral side chains allow the formation of ferroelectric liquid crystals. Side chains may also be polymerizable or polymeric liquid crystals, such as undecyl acrylate or p-phenylene terephtalate. Simultaneously with other requirements it is preferable that the side groups 1002 that are attached with the HNT 1001 are triangularly shaped so that they fill the space well (FIG. 10). This can be accomplished, for example, by a dendritic structure, in which aromatic moieties are attached with ether, ester, or amide bridges. In addition, these moieties can contain polymerizable groups 1003, such as acrylates, epoxies, and isocyanates. Epoxies and isocyanates require a comonomer, such as diamine or dialcohol for the polymerization.

Amino and hydratzino groups that are located either at the ends or sidewalls will react with some monomers, such as acrylonitrile (FIG. 11) or aminoacid N-carboxyanhydrides, and initiate polymerization. Polymerization may be started also by radical or cationic initiators. Polyacrylonitrile is a good glue, and when tens or even thousands of polymer chains are grafted to each HNT, the glue would be very strong. Addition reaction of the amino group 1102 and 1103 to acrylonitrile will join one acrylonitrile 1104 and 1105 with each amino group. These will serve as starting points for further polymerization to yield polymeric chains 1106 and 1107 (FIG. 11 C) either by radical or anionic polymerization mechanism. Some amino groups can be reacted with acrylic acid to form acryl amide moieties 1110 (FIG. 11 D). When the polymerization propagates, some chains 1111 will incorporate these acrylamide moieties (FIG. 11 E), and the HNTs 1101 and 1108 will become covalently connected.

Upon heating polyacrylonitrile chains start to fuse and form polycyclic aromatic structures. Heating is started at about 300° C., and the temperature will be gradually increased even above 1000° C. The product is known as carbon or graphite fiber. When these structures are now combined with the spectacular properties of the HNTs, the new hybride material will have unique strength, electrical and thermal conductivity. In order to improve the fusion of the HNTs and newly formed graphitic structure, iron, nickel, cobalt, or molybdenum nanoparticles may also generated according to this invention either before or after the formation of the polymeric side chains. The iron nanoparticles will facilitate the formation of new HNTs from polyacrylate or from some other carbon containing polymer. Also lower temperatures may be used than without catalytic nanoparticles. The HNTs and catalytic particles will also template the growth of new graphitic structures so that they will at least partly form tubular structures.

In order to connect many HNTs into a network some monomers may be bound with the HNTs so that they are still able to be inserted into a growing polymer chain. Thus, one polymer chain will bind together several HNTs (FIG. 11 E). Also each HNT binds several polymer chains, and a very strong network is created. The network is not necessarily covalent, but may be strongly hydrogen bonded. These materials of this invention are collectively called Hybtonites.

Condensation polymerization is also possible. These polymers include polyesters, like terephtalic acid ethylene glycol polyester, polyamides, such as Nylon™ and Kevlar™. For example amino-, or hydrazino-HNTs may be coupled with terephtalic acid dichloride. When terephtalic acid dichloride and 1,4-diamino-benzene are added in about equimolar amounts, polyamide side chains 1207, 1208 are formed that contain corresponding moieties 1203 and 1204 (FIG. 12). Use of a solvent or solvent mixture, such as hexamethylphophoramide and dimethylacetamide is currently preferred. These side chains have the same chemical structure as the polymer that is commonly known as Kevlar™. The side chains are strongly hydrogen bonded (FIG. 12). They can glide relative to each other. However, very large number of hydrogen bonds must be broken at the same time, and a large force is required. After a short glide, about 0.7 nm or 1.4 nm, new hydrogen bonds can be formed, and the chains are again bound as tightly as before the glide. The process can happen several times at the areas that take the heavy load. Importantly, this process leads to more even distribution of the stress inside the bulk hybride material, and ideally will end up into a situation, in which the stress is evenly distributed. This is a common property of Hybtonites.

The polyamide side chains may be amino 1205 or carboxyl terminated 1206 depending of the stoichiometry of the components. Amino terminated polyamide chains may further react with epoxy group or some other moieties. Thus, a three layer hybride material consisting of graphite-like material 1301, polyamide 1302-1305, and epoxy 1306 and 1307 can be fabricated. Schematics of this and analogous materials is in FIG. 13. This type of a material is a further example of a Hybtonite. All polyamide chains are not necessarily covalently bound with graphitic material. Epoxy polymer 1307 can be connected with polyamide chains 1304 which are also connected with the graphitic material 1301. Polyamide chain 1302 can be connected only with graphitic material, or polyamide chain 1305 may not be connected with either. This layer structure can be more or less periodic. One or two of the layers may be macroscopic, in which case material is combination of composite and hybride material.

Graphite-like materials can be similarly coupled with monomers and polymers. With graphite sheets the coupling happens mostly via edges (FIG. 14). Bisepoxy compound 1403 can react so that one epoxy group will bind with nascent graphite edge, and will be strongly bound 1405.

Graphite fiber that has macroscopic graphite surfaces may be sputtered, or partially etched with plasmas, such as oxygen or ammonia plasma so that defect sites or even flat surfaces are roughened, and functionalized. The HNTs of this invention can then be bound with graphite fibers, either directly, by some cross-linker or polymer. Similarly, many other surfaces can be activated.

HNT-Particle Networks

One very important application of asymmetrically or differently end substituted HNTs is polymerization. Although the HNTs are themselves very large molecules, and bigger than several polymers they are considered as monomers in this approach. Tens, or even thousands of them are chemically coupled together in this method. Virtually all polymerization chemistries are applicable in this connection. One example is provided by aminoacid-CNT 306 that has amino-307 and carboxylic groups 304 at opposite ends FIG. 15). When carbodiimide is added, the amide bonds 1501 are created between the CNTs. In the FIG. 15 B the coupling of two CNTs is depicted, but the process can go on as long as there are reagents in the mixture. Branching is also possible (FIG. 15 C). Sometimes branching is desirable. Limited amount of branching will increase the tensile strength. Also in electric circuits branching is often necessary. The degree of branching can be controlled by coating molecules, and by certain recognition molecules that are attached onto the ends of the HNTs. For instance, the ring molecules or other coating molecules can be designed so that they provide steric hindrance so that two CNTs can approach, but not three.

The HNTs may connect two particles (FIG. 2). These particles can be atoms, molecules, nano or micro sized particles. Particles may be attached at the ends or the side walls of the HNTs. If each particle and HNT has two connections, a chain-like structure is created, resembling a linear molecule that is a special type of HNT. If the number of connections is further increased, a Hybtonite network is formed. The number of connections can be much bigger than two, and a dense three dimensional network is possible. This kind of network can be self-supporting, or it may be embedded inside of some bulk material 203, such as plastic, or glue (FIG. 2). The HNT network 202 can have extremely high tensile strength, electrical, and thermal conductivity. These properties depend also on the joining particles. Particles can be plastic, glass, silica, ceramic, semi conducting material, or metal. Particles may themselves be hybrid materials, such as metal coated plastic particles. For example, thiol terminated HNTs will spontaneously bind with gold coated plastic particles, and form a network. Because the thiol groups of this invention may directly π-bonded with the CNT, a good electrical and thermal conductivity between the HNT and gold is guaranteed. Thus, all properties can be simultaneously optimized. Thiol groups bind also with copper and silver nanoparticles. Also amino and hydratzino groups form strong bonds with copper and silver.

The nanoparticles and the CNTs can be mixed as such or in a solvent. Nanoparticles may also be synthesized in situ with the CNTs in order to fabricate HNTs. For the fabrication of bulk materials the solvent can be removed under reduced pressure. The product will be compressed in a desired shape, and optionally sintered.

In situ fabricated materials may be deposited in other forms than particles. For example, some materials may form concentric tubes around CNTs so that the CNTs are essentially coated hydride tubes. The coating process may be thermal, sonochemical, photochemical, or electrochemical. For instance several metals, and some metal oxides can be deposited either as particles or continuous tubes on the surface of the CNTs. The deposition is facilitated by certain functional groups, such as carboxylic, amino, and thiol groups on the surface. Examples of metals that can be deposited include cadmium, copper, silver, gold, and palladium. Molybdenum tends to deposit as an oxide. Several other metals, such as cadmium and copper can be oxidized electrochemically or by oxidizing agents into corresponding oxides. Layers of metal oxides, such as aluminum oxide, titanium oxide, gallium oxide, lanthanum nickel oxide and zirconium oxide, silica and several other compounds, including zinc selenide, lead selenide, cadmium telluride, mercury telluride, gallium phosphide, gallium arsenide, and indium antimonide can be formed by the methods that are analogous to atomic layer deposition (ALD or ALE). HNTs that are coated with semiconductors are useful for the fabrication of solar cells and in optoelectronic applications, because the semiconducting outer tube can inject the charge carrier into the CNT that is able to carry it to the external circuitry with minimal resistance. The semiconducting coating may be itself at least partially coated with photoactivable redox molecules or particles, such as ruthenium chelates, or quantum dots. Titanium dioxide is especially advantageous semiconductive coating for the HNTs in solar cell applications.

In one embodiment of the present invention amino or hydratzino groups containing NHTs are mixed with epoxy, isocyano, isothiocyano, maleimide, or acid anhydride compounds, "linker". Preferably, at least two epoxy or acid anhydride groups will be in the same molecule so that a polymeric nanostructured material, Hybtonite, will be formed. Suitable epoxy compounds are among others butanediol diglycidyl ether, bisphenol A diglycidyl ether, bisphenol A propoxylate dicycidyl ether, polypropylene glycol diglycidyl ether, and resorcarene di-, tri-, tetra- (FIG. 16 A), penta-, hexa-, hepta-, and octaglycidylether, or corresponding acrylates. Other types of cross-linkers include hexane-1,6-diisocyanate, 1,4-phenylene dithiocyanate, bismaleimide, and perylene tetracarboxylic acid dianhydride (FIG. 16 B). The schematic reaction of bisphenol A diglycidyl ether 1701 with amino-HNTs 1101 and diamino compound 1703 is shown in FIG. 17. A continuous covalent connection will be formed between two amino-HNTs, when the new bonds 1705 and 1706 are formed. It must be understood that a multitude of moieties 1701 and 1703 may be incorporated between HNTs or HNGs. Also a mixture of different moieties may be used. For example, one or several amino compounds may be substituted with amino coated nanoparticles, such as silica or alumina particles. These may be aminated with (3-aminopropyl)trirethoxysilane. Also some bisphenol A diglycidyl ether molecules may be substituted with corresponding resorcarene derivatives, or with some other epoxy containing molecules or particles.

The aromatic moieties can be catalytically hydrogenated so that the compounds tolerate better oxygen, and UW-light. Currently preferred polyanhydrides are polyisobutylene maleic anhydride, and polystyrene maleic anhydride Linker and modified HNTs will be mixed as such or in a solvent, such as ethanol, iso-propanol, dimethylformamide (DMF), dichlorobenzene, tetrahydrofurane (THF), carbondisulfide, or water. Especially, when water is solvent, detergents or some other solubilizing agents are used. For example, hydrazine treated CNTs, hydrazino-HNTs, in THF can be mixed with polystyrenemaleic anhydride THF or toluene solution. This mixture can be used for spin coating of silicon, glass, or any other substrate. These kind of solutions can also be used to fabricate. fibers.

Similarly other graphite-like materials can be attached with other particles, and various kinds of networks can be created. Because these graphitic materials absorb well electromagnetic radiation, the mixtures can be heated fast and evenly with IR-, or microwave radiation. For example, polymerization of epoxies can be done efficiently with microwaves in glass, ceramic, or composite molds, or in the molds that are partly made of these materials.

Connecting Two or Several Pieces

A common name 'elastomer' is used for plastics, composites, and hydride materials in this context, because all these materials have tendency to deform continuously under stress, and recover their original shape, when the stress is removed provided that the stress is not excessive.

Elastomers have become a ubiquitous material. They are replacing metals in ever increasing applications. Joining of elastomer parts is one limiting factor for even larger scale use of elastomers. Glue is an obvious solution, but several elastomers have very low adhesion for glues. Powerful organic solvents are needed to soften the surface of the elastomer to improve adhesion. Melting the pieces together is another alternative. However elastomers have very poor thermal conductivity, and only edges can be easily joined by heating. Use of solvents and heat in conjunction of the present invention will be described in more detail. In the general case three components are included, two pieces that are being connected and a glue FIG. 18). The word glue is used in a very broad sense, it may be gaseous, liquid or solid. Any or all of these components can be hybride materials of this invention.

Solvents can soften and even dissolve away a thin layer of the surfaces 1805 and 1806 of two pieces 1801 and 1803 which may or may not be identical. If the surface consists of the hybride material of this invention, some HNTs and associated particles may be exposed 1802. This will make the surface hairy (FIG. 18 B). The glue 1804 may encapsulate these HNTs. The glue itself may be hybride material of this invention, and the HNT-particle network may be extended from the solid piece into the glue almost seamlessly. This process may happen between both pieces and the glue. This will in essence mean that the two pieces will be joined so seamlessly that they will become one piece (FIG. 18 C). In its simplest form the glue is only a solvent that facilitates the joining of two pieces. The HNT networks of the two pieces will be connected directly without any intermediate HNTs.

The surfaces can be softened or even melted by heat. The process resembles the solvent induced joining of the pieces. These two methods can also be combined. Heating can be performed by transfer of thermal energy, but currently electromagnetic heating is preferred (FIG. 19). Heating of whole pieces 1901 and 1902, while joining them together is not advantageous, because the pieces will soften too much and possibly deform. Also poor thermal and electrical conductivity prevent the use of some techniques that are familiar, when processing metals. Local heating between two pieces may be achieved by electromagnetic radiation 1906 that is absorbed by material, linker 1903, that is placed in that area. Microwaves 1906 penetrate easily most elastomers, and do not heat the elastomer significantly (FIG. 19 C). However, if the elastomer is covered by an absorbing material 1903 that material will get hot and also heat the surface of the plastic. Instead of microwave radiation some other part of electromagnetic spectrum may be used.

Analogous methods can be used, when molds are used to fabricate a new piece. In that case the pieces 1901 and 1902 represent the mold and the material 1903 is the material of this invention that is molded and polymerized into a new piece. At least the piece 1901 must be transparent to the radiation 1906 that is used for the heat induced reaction. Also ultrasonic vibration may be used to speed up curing.

Many linkers may be used. HNTs and metals absorb strongly electromagnetic radiation. Some other materials absorb specific frequencies, and may be used for certain applications. Metal can be in the form of nano or micro particles, wires, or grids. Almost any metal will do, but currently preferred metals are aluminum, zinc, iron, nickel, chromium, copper, silver, and gold.

HNT-metal network is ideal for the electromagnetic heating. Not only the radiation is absorbed, but the heat is effectively distributed.

Connecting graphite or carbon fibers with the HNTs of this invention is preferably done so that the surface of carbon fibers is first chemically modified. Currently preferred modification method is to expose the fiber to oxygen, ammonia, halogen plasma, or some molecular plasma, such as allylamine or acrylonitrile plasma. Ammonia plasma is most preferred. Thus the surface is partially coated with amino groups. These can be reacted with the cross-linking reagents, so that the surface can bind hydroxyl-, thiol-amino-, or hydrazino-HNTs. When the carbon fiber is encapsulated into HNT-epoxy or HNT-plastic, there will be covalent connection between HNTs and carbon fibers. Also filler material (epoxy, plastic) may be covalently coupled with both the HNTs and carbon fibers. These reactions may be performed in a continuous roll to roll device.

CNTs and HNTs may be treated with plasma in a reactor 2001 (FIGS. 20 A and B). FIG. 20 A represents the primary reaction of this invention. The graphite-like material is treated with strong electromagnetic radiation from the source 2003. The graphite-like material 2006 that has been activated and the reagent 2004 enter the reactor 2001, and the reaction product 2008 (Close up in FIG. 20 C) is formed. The product is collected from the tube 2009. FIG. 20 B represents the secondary reaction of this invention, in which the reactant 2005 is activated and the graphite-like material 2007 that may be also CNTs or HNGs enters as such the reaction chamber 2001. The product 2008 may look similar or different in both cases (FIG. 20 C).

Continuous Films

Continuous films can have molecular thickness, microscopic, or macroscopic thickness. Macroscopic films resemble bulk materials in several respects, and can be considered as paints. However, their applications are sometimes unique. Electrical and thermal conductivity of the hybrid materials of this invention allow their use as antistatic materials, for the protection against electromagnetic pulse (EMP), UV and radioactive shield, and thermally dissipative materials. For example, aging of plastics in sun shine results from heating, and most importantly from UV radiation that will ionize molecules. Local heat and electric field gradients are created that will strain the material. Good thermal and electrical conductivity will dissipate these gradients fast and the damage is minimized. Moreover, the absorption of the electromagnetic radiation by hybride tubes will protect the surrounding material.

Post Treatment of the Surfaces

The fibers or at least their surface layers contains HNTs. For many applications, including some electronic applications, it may be desirable that the fibers do not have any HNTs on the outmost surface layer. Then the fibers should be coated with a layer that has desired properties, such as electric insulation. Plastics and rubber are preferred coating materials, because they are flexible.

Sometimes just the opposite is true, it might be preferable have a "hairy" HNT surface on the fiber. This is especially the case for hydrophobic fibers, or fiber in the areas of electric interconnects. These can be fabricated by using a bath or spray of a solvent that is able to soften or partly solubilize one of the components in the hydride material (FIG. 17, upper part). The fiber is moving very fast to an area, where it is treated with a second solvent that removes the residues of the first solvent, and solidifies the surface of the fiber. Typical solvent combination is ethyl methyl ketone and methanol. Methanol may still contain water. These "hairy" fibers may be further coated with a very thin layer so that the hairiness is not covered. The coating can be polyethylene or polytetrafluoroethylene. Coating can be made by spraying or evaporation. Also monomers can be sometimes be directly polymerized onto the surface. These kind of structures are superhydrophobic.

Applications

The materials of this invention, Hybtonites, can be used almost everywhere, and only some of the most important applications can be mentioned.

Sports equipment require often the best possible materials, because they must be light, tough, and durable. Some examples of the sports equipments that benefit from Hybtonites are ice hockey sticks, and pads, tennis rackets, golf clubs, base ball bats, cross-country and down hill skis, ski boards and sticks and poles, bikes, surf boards, boats, and fishing rods.

Various panels and prepregs can be fabricated using Hybtonites. In the simplest form reactive liquid two component mixture is between two plastic sheets. The prepreg is bent into a desired shape, for instance, with a mold, and heated. The reactive mixture will form Hybtonite that is solid, and will retain the shape. Almost any structures can be made with this method. The reactive layer between two plastic sheets may contain glass or graphite fibers.

Many machine parts may be made directly from Hybtonites or from prepregs that contain Hybtonites, especially in demanding applications. These include rollers, and supporting structures.

Transportation vehicles, cars, motorbikes, snowmobiles, airplanes, and helicopters benefit greatly form lighter, and sturdier materials. Almost any part, with the exception of the combustion engines, and turbines can be made of the materials of this invention.

Buildings, trains, and ships may have Hybtonite panels as supporting structures, floors, walls, and ceilings. Whole bridges, or some parts for bridges may be made of Hybtonite.

Structures that provide electromagnetic shield can be made from Hybtonites. For example, wireless link station casings could be Hybtonite. The electromagnetic noise will penetrate poorly through most Hybtonites. Similarly, the nanomaterials of this invention will protect against radioactive radiation, especially neutron radiation. These kind of shields that in addition to graphitic materials contain lead, lead chloride, lead oxide, or lead sulphide nanoparticles may be highly useful in nuclear power plants.

Various pipes, such as water and sewage pipes, containers, and water, gas, and chemical tanks may be made using Hybtonite.

Hybtonites may be used as coating materials. Especially, when durability, corrosion resistance, antistatic properties, electrical or thermal conductivity are important. One example is the coating of gas station yards.

EXPERIMENTAL DETAILS

While this invention has been described in detail with reference to certain examples and illustrations of the invention, it should be appreciated that the present invention is not limited to the precise examples. Rather, in view of the present disclosure, many modifications and variations would present themselves to those skilled in the art without departing from the scope and spirit of this invention. The examples provided are set forth to aid in an understanding of the invention but are not intended to, and should not be construed to limit in any way the present invention.

Example 1

CNTs (10 mg, purity about 11%) were suspended into 10 ml of THF. Hydrazine solution (1 ml, 1M) in THF was added. The vial was closed under nitrogen. The contents were treated with ultrasonic vibration for 2 h. The THF turned almost black, and most of the CNTs had dissolved. The magnetic impurities were removed by keeping the vial close to a permanent magnet, and pipetting the THF into another vial. The THF solution (suspension) was mixed five minutes with polypropene beads to remove the tar like residue (amorphous carbon). A sample of the solution was put onto a silicon substrate, and the SEM image was recorded (FIG. 22). Elemental analysis of a sample that had been kept at 250° C. for two hours contained 4.3% of nitrogen. Near IR spectrum showed minor differences with the spectrum of the starting material. Thus, the integrity of the HNT was retained.

Example 2

Same as example 1, but catalytic particles were first extracted by acid, neat hydrazine (2 ml) was used, and sonication was performed with high powered tip sonicator. After hydrophobic extraction the hydrazine was evaporated. The hydrazino-HNTs were much shorter than in example 1. The hydrazine end and side wall groups were detected by fluoresceine isothiocyanate labeling from a small sample. The hydrazine groups were reduced using horizontal gold coated polycarbonate disk as a working electrode and platinum wire is a counter electrode. The hydrazino-HNT powder was put onto the gold surface. Ruthenium chloride water/methanol solution was added, and 1 V potential was applied. The product was washed with water/methanol mixture, and dried.

Example 3

Into the purified reaction product from Example 1 was added 100 mg fluorescein isothiocyanate. The reaction mixture was stirred well for one hour. Water was added (10 ml), and the mixture was put into a dialysis tube, and dialyzed against 200 ml of PBS buffer. The dialysis was continued for two weeks so that the buffer was changed every day, and the dialysis tube twice a week. No fluorescence could be detected in the last two buffers after the dialysis. The fluorescence and absorbance of the reaction product was measured against standard fluorescein solutions. The absorbance was 0.3 units corresponding the fluorescein density of 8000 per one micrometer of the amino-HNT. The HNT bound fluorescein had quantum efficiency one third of soluble fluorescein, because the quenching effect of the HNT.

Example 4

The product from Example 2 was treated with 10 mg of bis(N-hydroxysuccinimide)polyethyleneglycoldicarboxylate MW 5,000, Shearwater Polymers, Inc., Alabama) in 2 ml of phosphate buffer, pH 7.5. After one hour the HNTs were washed with water/methanol. The free carboxylate groups were reactivated by 5 mg N-hydroxysuccinimide, and 10 mg EDC, and aminohexyl-$T_{16}$ oligonucleotide was added. After one hour the mixture was washed with water/methanol, and centrifuged. Tween-80 (1%) in water was added, and the mixture sonicated. The solution was used as such.

Example 5

CNTs (10 mg, purity about 11%), and L-tryptophan (20 mg) were suspended with 10 ml of water. The mixture kept in ultrasonic bath for 8 hours, and further treated with a tip sonifier (300 W) for 15 minutes. After centrifugation at 5000 rpm for 10 minutes the supernatant was pipetted into another test tube. Fluorescein isothiocyanate (40 mg) in 1 ml of ethanol was added. The mixture was dialyzed three times against 200 ml of water. Imaging with confocal microscope showed that the HNTs were coated with fluorescein.

Example 6

CNTs (10 mg, purity about 11%) were suspended with 10 ml of carbon disulfide. Sulfur (32 mg, 1M) in carbon disulfide was added. The vial was closed under nitrogen. The contents were treated with a tip sonifier (500 W) for 30 minutes. The carbon disulfide turned almost black, and most of the CNTs had dissolved. The magnetic impurities were removed by keeping the vial close to a permanent magnet, and pipetting the carbon disulfide into another vial. The HNTs were separated by centrifugation the carbon disulfide solution (suspension). The dark S-HNT layer was separated by a pipet, mixed with 5 ml of carbon disulfide, and separated by centrifuge again. The S-HNT layer was suspended into 10 ml of THF in ultrasonic bath. An aliquot of 0.2 ml of this solution was placed onto a 1 $cm^x$ 1 cm quartz plate. Silver nitrate solution (0.2 M) was placed on top of the S-HNTs. A potential of 0.8 V was applied 30 seconds. The resistance of the film was 25Ω.

Example 7

S-HNT suspension in THF was prepared as in example 6. Sodium borohydride in ethanol was added. After 30 min 0.1 M hydrochloric acid was carefully and slowly added. The thiol-HNTs were separated by centrifugation at 14,000 g, and washed with ethanol.

Example 8

Into the product from the example 1 was added 10 mg of chromium hexacarbonyl. The mixture was treated with ultrasonic vibration five hours. A sample was put onto a TEM grid. In the TEM image the HNTs and associated chromium nanoparticles were clearly visible.

Example 9

Polyethylene sheet that was on a glass plate was covered by thin layer of nickel powder (400 mesh) and carbon nanotubes. The excess was gently blown off by nitrogen. Another polyethylene sheet and another glass plate was placed on the top of the first polyethylene sheet in a microwave oven. The sheets were pressed together by one kilogram ceramic weight. After heating 10 minutes the sheets were joined together.

Example 10

Into 100 g of bisphenol A diglycidyl ether was mixed 6 g of graphite flakes (5-10 µm). The mixture was sonicated two hours. The reaction mixture was further mixed with bis(aminomethyl)-dimethylcyclohexane and diaminopropylene glycol. Standard test pieces were molded of this mixture and two reference pieces. One reference did not contain any graphite, and the other contained graphite that was only mixed. The ultrasonicated samples had improved Young's modulus (22% increase), strength at the break (12%), chemical resistance (15%), and glass transition temperature (9° C. increase).

Example 11

Into 100 g of bisphenol A diglycidyl ether was mixed 0.5 g of single walled carbon nanotubes. The mixture was sonicated one hour. The reaction mixture was further mixed with bis(aminomethyl)-dimethylcyclohexane and diaminopropylene glycol. Standard test pieces were molded of this mixture and two reference pieces. One reference did not contain any CNTs, and the other contained CNTs that were only mixed. The ultrasonicated samples had improved Young's modulus (16% increase), strength at the break (8%), chemical resistance (12%), and glass transition temperature (6° C. increase). The mechanical properties were measured with Messphysik, midi 10-20/4×11 instrument.

The chemical resistance of a cured nanoepoxy resin system is determined by exposing sample pieces of the nanoepoxy system for days to different environments at several temperatures, like boiling water and alcohol for example. Nanoepoxy systems give 5 to 15 percent better chemical resistance than reference samples.

Example 12

A test piece that had dimensions 5 mm×5 mm×0.1 mm was made of the materials fabricated in Example 10. The piece was heated in 5 ml of N-methyl pyrrolidone one hour. The graphite did not disperse demonstrating that a network had been formed.

Example 13

CNTs (100 mg) were placed in a vial into a plasma reaction chamber. Ammonia plasma was generated with AC field (13.56 MHz, parallel plate reactor) in Oxford RIE Plasmalab instrument. Plasma power was 60 W, and the reaction time was 2 min. The product was further treated as described in Example 11.

Additional modifications and advantages will readily occur to those skilled in the art. Therefore the invention in its broader aspects is not limited to the specific details, and representative materials and devices shown and described. Accordingly, various modifications may be made without departing from the spirit and scope of the general inventive concept as described in the disclosure and defined by the claims and their equivalents.

We claim:

1. A method for the fabrication of hybrid nanomaterials containing graphite-like particles and at least one reagent having chemical moieties and groups, wherein
    the graphite-like particles in a reaction mixture are cut by electromagnetic radiation in order to create nascent sites with high reactivity on sidewalls of the graphite-like particles, and
    the at least one reagent is present in the reaction mixture during the said cutting of said particles, such that the moieties and groups are immediately attached with the nascent sites by covalent bonds, and
    oxygen and water are essentially excluded from the reaction mixture.

2. The method of claim 1, in which the graphite-like particle is a graphite particle.

3. The method of claim 1, in which the at least one reagent contains an amino group.

4. The method of claim 3, in which the at least one reagent is hydrazine or hydrazine derivative.

5. The method of claim 1, in which the at least one reagent is sulfur, hydrogen sulfide, or mercapto compound.

6. The method of claim 1, in which the at least one reagent contains an epoxy group.

7. The method of claim 6, in which the epoxy group is derived from the group consisting of butanediol diglycidyl ether, bisphenol A diglycidyl ether, bisphenol A propoxylate diglycidyl ether, and polypropylene glycol diglycidyl ether, and resorcarene di-, tri-, tetra-, penta-, hexa-, hepta- and octa-glycidylether.

8. The method of claim 1, in which the graphite-like particles are reacted with at least one amino group-containing reagent to form an amino-hybrid nanomaterial, and the amino-hybrid nanomaterial is further reacted with bisphenol A diglycidyl ether and a diamino compound to form a crosslinked structure.

9. The method of claim 8, in which a multitude of bisphenol A diglycidyl ether and diamino moieties are incorporated between the amino-hybrid nanomaterial.

10. The method of claim 1, further comprising coupling two or more hybrid nanomaterials together.

11. The method of claim 10, in which two or more hybrid nanomaterials are coupled together via amide bonds.

12. The method of claim 10, in which thousands of hybrid nanomaterials are bonded together.

13. The method of claim 1, in which the hybrid nanomaterial including an amino or hydrazine group is coupled with a crosslinker selected from a group consisting of epoxy, isocyano, isothiocyano, maleimide, and an acid anhydride.

14. The method of claim 13, in which at least two epoxy or acid anhydride groups are present in the crosslinker to form a crosslinked network of the hybrid nanomaterial.

15. A hybrid nanomaterial that is produced by the method of claim 1.

16. The method of claim 1, in which the graphite-like particle is a carbon nanotube.

17. The method of claim 16, in which the carbon nanotubes have been purified by removing the impurities consisting of catalytic particles and amorphous carbon with a magnetic field.

* * * * *